United States Patent [19]

Kelly, Jr.

[11] Patent Number: 4,670,739

[45] Date of Patent: Jun. 2, 1987

[54] COMMUNICATION SYSTEM ESPECIALLY USEFUL AS AN INCIDENT LOCATION REPORTING SECURITY SYSTEM

[76] Inventor: Lawrence R. Kelly, Jr., 21 Harvard Ct., Rockville, Md. 20850

[21] Appl. No.: 681,639

[22] Filed: Dec. 14, 1984

[51] Int. Cl.⁴ .......................... G08B 1/08; H04Q 7/00

[52] U.S. Cl. .................................... 340/539; 340/534; 340/345; 340/346; 340/348; 340/870.24; 340/825.63; 375/22; 455/53

[58] Field of Search ............... 340/539, 531, 534, 506, 340/345, 346, 696, 348, 349, 353, 825.63, 870.24; 455/9, 67, 53; 375/22

[56] References Cited

U.S. PATENT DOCUMENTS

| | | | |
|---|---|---|---|
| 3,848,231 | 11/1974 | Wootton | 340/539 |
| 3,852,713 | 12/1974 | Roberts et al. | 340/539 |
| 4,072,898 | 2/1978 | Hellman et al. | 340/696 |
| 4,178,459 | 12/1979 | Ledenbach . | |
| 4,523,184 | 6/1985 | Abel | 340/539 |

*Primary Examiner*—Donnie L. Crosland

*Attorney, Agent, or Firm*—Millen & White

[57] ABSTRACT

The Incident Location Reporting Security System pertains to a device that is capable of determining instantaneously, via the use of pulse-width coded modulation, the location of incidences such as burglary, robbery and fire. Detailed multi-point monitoring can be carried out in such varied sites in a multistory buildings, residential neighborhoods, museums or individuals. The concept allows for generation and reading of billions of different codes through the simplistic design of a coded receiver wherein codes are read instead of matched. In achieving this capability, a base number is created by multiplying the plurality of positions of a switch times the number of switches and thereafter pulsing a transmitter a number of times to generate a code in which the base number is raised to the power of the number of times it is pulsed. Each transmitter is assigned a specific coded number and a single receiver rapidly processes and identifies any coded number received. In order to identify the position of an individual immediately at the time an alarm is sounded, triangulation is used.

24 Claims, 13 Drawing Figures

COMMUNICATION SYSTEM ESPECIALLY USEFUL AS AN INCIDENT LOCATION REPORTING SECURITY SYSTEM

BACKGROUND OF THE INVENTION

1. Field of the Invention

The instant invention relates to communication systems, and more particularly, the instant invention relates to systems for generating codes in a communication system such as security system wherein the codes are identified with specific transmitters.

2. Technical Considerations and Prior Art

Existing state of the art security systems which monitor a plurality of locations are generally very expensive to install and require expensive computerized equipment to operate. Moreover, existing systems are not easily adaptable for individual use wherein a single person carries a transmitter with him which can instantly notify a central monitoring station as to the identity and location of that individual should the individual encounter trouble. Existing systems may indicate that an individual may be experiencing difficulty, however, the identity and location of the person experiencing difficulty cannot be determined precisely utilizing existing systems.

A relatively simple system has been developed for use with garage door-openings. U.S. Pat. No. 4,178,549 and U.S. Pat. No. Re. 29,529 disclose such arrangements. However in each case, there is a single receiver which responds to only one pulse-width modulated code rather than responding to a plurality of different pulse-width modulated codes. In other words, the received signals are matched instead of being read. The particular technology utilized in these patents does not require expensive computerized equipment and is widely used by consumers. Even though such a system is very difficult to jam or deceive, yet it has not been utilized for alarm systems. There are of course numerous disclosures of a single receiving station which responds to a plurality of separate stations or conditions. Patents indictative of this arrangement are U.S. Pat. Nos. 3,209,342; 3,299,404; 3,289,107; and 4,047,107. However, none of these references disclose a passive receiver which simply reads pulse-width modulated signals. The prior art does not suggest that enormous savings in costs while an increase in capacity of a communications system exemplified by a security system may be effected by utilizing pulse-width modulations as suggested in U.S. Pat. No. 4,178,549 and U.S. Pat. No. Re. 29,529.

SUMMARY OF THE INVENTION

The instant invention contemplates a communication system which includes a central receiver in a plurality of transmitters, each transmitter generating a pulse-width modulated code particular thereto. Each transmitter further includes circuit elements, each of which has a plurality of different pulse-width modes. Each of circuit element is set in one of the modes to provide each transmitter with a code, wherein the number of codes available to the transmitter is determined by the number modes raised to the power of the number of circuit elements. The transmitter generates a carrier signal which carries the pulse width modulated code of that transmitter to the receiver as a coded pulse train. The receiver responds to the carrier signal and reads the code transmitted by that transmitter without matching.

In a more specific embodiment of the invention, there is provided a single fixed radio frequency tuned circuit that is capable of reading large numbers of pulse-width coded modulation signals (wave trains) without the need for changing the circuit or including additional components to read the multiple signals. Through employment of the aforesaid circuit/configuration the identity of an individual, location and/or character of security related events such as the address of a house, museum painting or the indication of the need for "Help", burglary, fire, etc. may be identified. The reading capabilities of the aforesaid circuit configuration and concept can be expanded to read thousands, millions, billions, ad-infinitum pulse-width coded modulation signals with one fixed radio frequency tuned circuit. Through the aforesaid circuit ad-infinitum occurrences of security/non-security events and the character of the events such as "Help", burglary, fire, environmental control status, etc., can be read and monitored. Pulsing a single transmitter to generate different coded signal pulse trains thereby provides multiple digit transmission capabilities with potentially ad-infinitum digit combinations. Receiving and decoding the aforesaid multiple coded transmitter signals can be generated by the single radio transmitter through use of single, fixed tuned transmitter circuit/configuration. Relaying an alert coded signal through signal relay stations to compensate for transmission deficiencies in terms of transmission distance is also provided for as is relaying aforesaid signals via electrical wiring (building, home, telephone, etc.).

An audible/visual signal to indicate reception of the coded signal at either the source of signal transmission or point of signal reception is provided as an apparatus to activate selectively, through coded signals, devices such as video cameras/tape recorders, sirens/bells/-lights and any other desired alert mechanisms.

A microprocessor/printer/CRT could be used to process, document and printout/display information such as an individual's name, the date, time of day, type of event/occurrence, address of location of the event, etc.

A security system can be armed or disarmed through radio transmission and reception of a coded pulse width modulated signal.

Through aforesaid means of generating and receiving, with the same transmitter and receiver, an alert signal and an arm/disarm signal may be generated.

An electro-mechanical solenoid may be provided to operate with a door or safe in response to the arming or disarming signal of the aforesaid means.

DESCRIPTION OF THE PREFERRED EMBODIMENT

Figure 1:
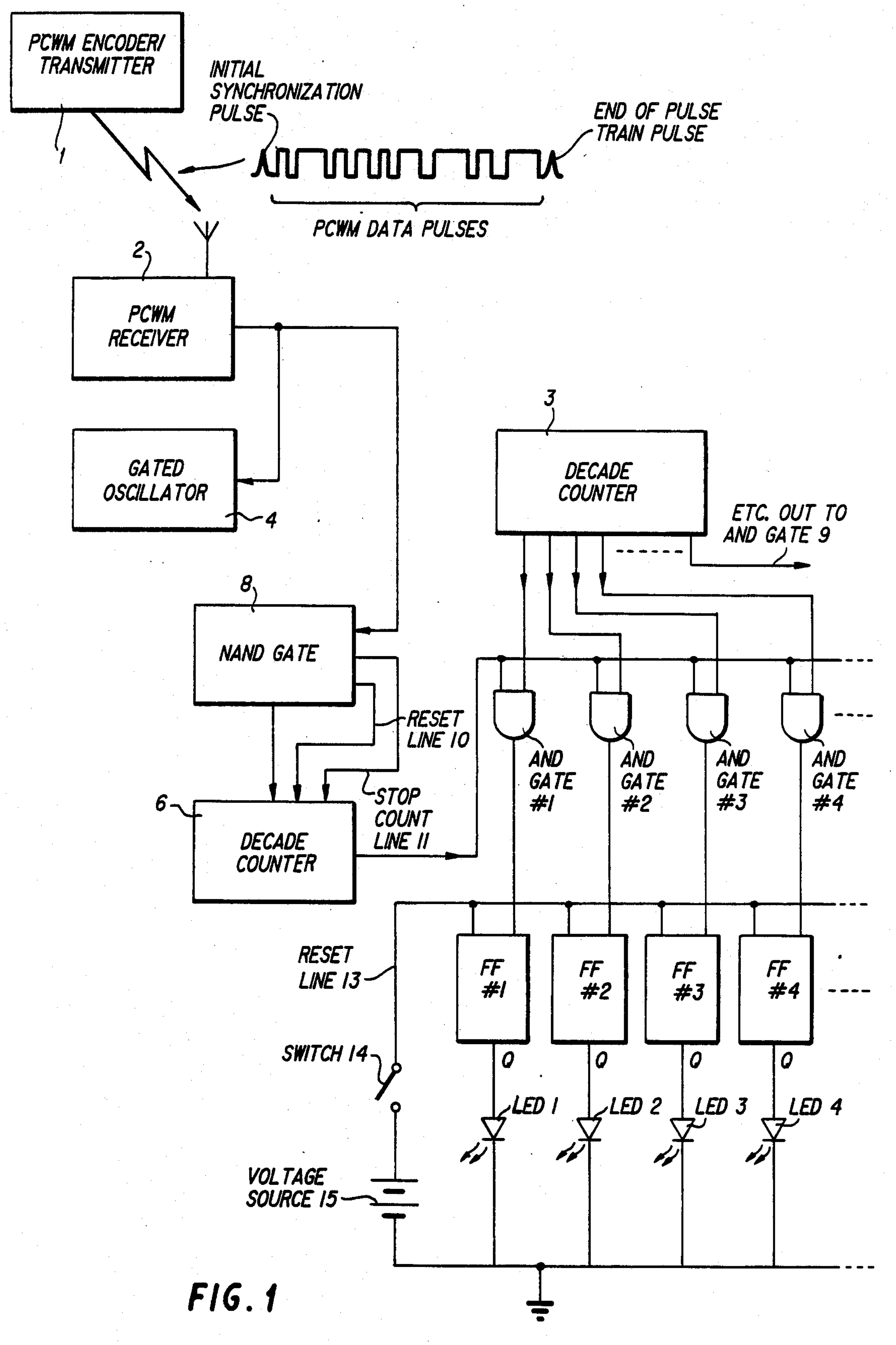
FIG. 1 is a block diagram of an encoded transmitter in accordance with the principals of the instant invention which transmits a pulse-width mudulated code.

The basic part of the Incident Location Reporting System is capable of reading instantaneously electronic information communicated in the form of pulse-width coded modulation. This capability far exceeds that of individually matched coded circuits such as coded radio transmitters/receivers for garage doors, wherein the code of the receiver is set to the same code as the transmitter to permit activation of the receiver when the transmitter is activated. In other words, if a given transmitter could be set to 19,000 different codings, then, theoretically, one would need 19,000 receivers, individually set to each potential transmitter coding, in order to receive the transmitter's total coded transmission capability. This scenario is acceptable for garage door openers wherein a customer would normally want only one transmitter and a companion receiver that can be matched to the same code settings.

However, this situation (of 19,000 receivers for one transmitter with 19,000 code setting capability) would be intolerable if one wanted one circuit that could, conceptually, read and display the identity of all 19,000 code settings.

Although the circuit was developed to read pulse-width coded modulation, its concept, with a few modifications, can be employed to read other pulse coded forms. No computer or microprocessor is required to interpret the signal, despite the fact that either, including a printer, could be used to facilitate the information process.

With the advent of the instant invention, technology now exist in very simplistic form wherein events can be identified instantaneously in terms of determining the location of various incidents. For example, the instant invention has great application in the "Neighborhood Watch Programs" that are becoming increasingly popular across the USA. By utilizing the instant invention, each house of a hypothetical 200 house neighborhood would have one transmitter with its unique code. Such transmitters retail for $25 to $30 each on the market today. The receiver in this invention, which includes about $30 worth of electronic components (retail costs) including its cabinet, is battery powered and can be easily carried around by the neighborhood watch captain(s). In the event of an emergency (sickness, burglary, fire, bodily attacks, etc.), all the holder of the transmitter has to do is activate the transmitter (depress its "ON" button) for at least one second. The receiver receives the signal via radio wave reception, for example, from any one of the 200 houses and identifies the location of the source signal as a result of having deciphered the code associated with the location given that code. Based on this very exciting capability, help can be dispatched, theoretically, within several seconds of event notification. The above example depicts a passive mode of operation from the aspect of the receiver. However, with or without the addition of simple microprocessor/printer, the invention can easily perform the active role of interrogating/polling each of the 200 houses simultaneously for incident determination/location.

It is extremely important to note, as alluded to above, that this concept allows for not only identifying an individual's name and identifying the location of an incident, but also the character, i.e, sickness, fire, burglary, etc. Moreover, the concept allows for the connection of various sensors/audio alarm devices (fire, burglary, etc.) to the circuit for use in residential and/or commercial security; communications via radio waves, A/C circuit wiring, telephone networks; information networking, etc.

The following is a listing of some of the many worldwide applications of the instant invention:

1. Neighborhood Watch Program
2. Hospitals
3. Senior Citizens' Apartment Buildings
4. Museums (Priceless paintings/artifacts)
5. Hotels, Apartments
6. Commercial Buildings and Warehouses
7. Shopping Malls (each store and/or department/location within each store is provided their own unique transmitter/code)
8. Query of Locked File Safe Security Status
9. Security in Subway Transportation Systems
10. Military (including field operations wherein coded positions are preassigned, for example, to certain locations on a map)
11. Cable TV—Makes the provision of residence security very simple
12. New, Novel Communication Process (intra/inter buildings/equipments)
13. Etc.

Additional salient features of the instant invention include:

1. Ease of manufacture
2. Simplistic Design
3. Extreme accuracy
4. Very reliable
5. Simple microprocessor and printer can be used with the instant invention to print out, for example, the name of the individual who sounds an alert and the location of the incidence, date, time, and type of event.

Referring now to FIG. 1 of the drawings, the encoder/transmitter 1, pulse width coded modulation (PWCM), is activated for approximately one (1) second. During this time period transmitter 1 emits a pulse width coded modulated radio signal in the form of a pulse, train shown in FIG. 1, which lasts, lets say, 35 milliseconds in time duration. The first and last pulses are the initializing synchronization and end of pulse train pulses, respectively; and the ones in between are the PWCM data pulses. The character of the widths of the pulses that constitute the pulse train is directly related to modes determined by a plurality of circuit elements, which circuit elements have switch positions that are set on the encoder/transmitter 1 to establish its code. Technology for such transmitters is commonly known, and the number of switches range from two to more than nine; and the switch positions for each switch usually range between two and three in number. For example, a nine (9) switch configuration with a three (3) switch position capability for each switch, can generate $3^9$ or 19,683 different code settings. PCWM receiver 2 is fixed tuned, in terms of the carrier frequency to PWCM Encoder/transmitter 1 and represents an ordinary amplitude-modulated (AM) type receiver. The demodulated pulse coded train from receiver 2 is simultaneously fed into Decade Counter 3 and Gated Oscillator 4. Decade Counter 3 simply counts the pulses of the pulse train outputted by receiver 2, excluding the initializing synchronization and end of pulse train pulses. For each count of the pulse train (positive logic, discrete pulse widths), Decade Counter 3 sequentially activates, via Data Point 1, Data Point 2, etc., one leg of AND gates 1 thru 9. Oscillator 4 is gated on for a length of time directly dictated by the time duration of each pulse of the pulse train outputted from receiver 2. By adjusting the frequency of Oscillator 4, it is possible to control the number of cycles of the signal from Oscillator 4 (at a given frequency) that are counted by Decade Counter 6, in direct relationship to the time duration of the individual pulses of the pulse train. For example, the frequency of Oscillator 4 is set such that Oscillator 4's signal is counted by Decade Counter 6 only during the widest pulses of the pulse train such as 7, and 9 in FIG. 1. Specifically, the time period of Oscillator 4's signal exceed the length of the narrow pulses but is measurably less than the pulse duration time of the widest pulse. Since the leading edges of the data pulses within the coded pulse train are in coincidence with regards to Circuits 3 and 4, then the output pulse from Decade Counter 6 will activate Activation Line 12 (connected to AND Gates 1 through 9) only during the time it reads a wide pulse.

Whenever there is a coincidence between the application of a voltage (logic 1, positive, for example) on Activation Line 12 and a pulse from Decade Counter 3, then the effected AND Gate, wherein both input legs are activated, will turn-on a latching flip-flops (1 thru 9) which in turn will switch on via its a output a light emitting diode (LED). Therefore, any of the LEDs (9 in total number, for example) that are activated during reception of a pulse coded width train, bear a direct one to one relationship to the widest pulses in a given pulse train. Furthermore, according to the above explanation, only LEDs 7 and 9 would turn-on. Reset Line 13, switch 14 and voltage source 15 are simply used to reset Flip-Flops 1 through 9, turn off LEDs 1 through 9 to prepare the circuit for receipt of another alert. In other words, the circuit directly reads or decodes the pulse coded width modulated pulse train. The narrowest pulses in the example, are not read nor do they cause activation of the LED's. However, by setting the lower ratios, different pulse widths, and therefore switch positions, can be read. In summary, the LEDs that turn-on during a reading directly correlate with the switch positions on the encoder/transmitter. Given this capability, large numbers of encoder/transmitter units can be set to different code settings and assigned to various people and/or physical locations. Therefore, when an activated encoder/transmitter signal code is read by the monitor unit, one can tell "who" and/or "what" activated the alert. If the encoder/transmitter is permanently installed, then one can determine "where" the alert took place. The second part of this invention solves the problem of "who" sounded the alert and "where" was it sounded when a person is non-stationery such as walking through buildings, or parking lots. It is important to point out that Decade counter 6 is resetted after each pulse, from receiver 2, within the pulse train by NAND gate 8 (connected to the reset line 10 and stop count line 11 inputs of Decade Counter 6); and that the data point (i.e., pin number on the chip) selected from Decade Counter 6 to activate Activation Line 12 is dictated by the ratio of the time period between the widest and narrowest data pulse in the pulse train. In other words, if the widest data pulse is 5 times wider than the narrowest data pulse, and Oscillator 4's time period is set to equal the narrowest data pulse width, then the 5th data point on Decade Counter 6 can be selected for an output to AND gate 1 through 9 via Activation Line 12. This situation equates to the 5th switch of the transmitter as being set to a wide pulse setting, and to the 5th LED being activated.

The above configuration can be employed to read any number of switches with a two switch position capability. For example, 9 switches on the transmitter with each switch possessing a two position capability, can generate $2^9$ or 512 different coded pulse trains, all of which can be read and displayed directly by the circuit.

For 9 switches, with each switch possessing a three (3) switch position capability, it is possible for the transmitter to generate $3^9$ or 19,683 different coded pulse trains. The circuit would read such configurations as follows (refer to FIG. 2):

Lets assume that the three (3) data pulse widths are generated by setting any one of the 9 assumed switches on the transmitter to: +, o, or −. These three position settings of any one switch dictate the setting of three (3) different voltage levels, thus resulting in three different pulse widths, i.e., narrow, medium and wide, all in terms of milli or microseconds. In this mode of operation there could be three banks or LEDs formatted as follows:

| | Columns | | | | | | | | |
|---|---|---|---|---|---|---|---|---|---|
| Rows | 1 | 2 | 3 | 4 | 5 | 6 | 7 | 8 | 9 |
| 1 | 0 | 0 | 0 | 0 | 0 | 0 | 0 | 0 | 0 |
| 2 | 0 | 0 | 0 | 0 | 0 | 0 | 0 | 0 | 0 |
| 3 | 0 | 0 | 0 | 0 | 0 | 0 | 0 | 0 | 0 |

Figure 2:
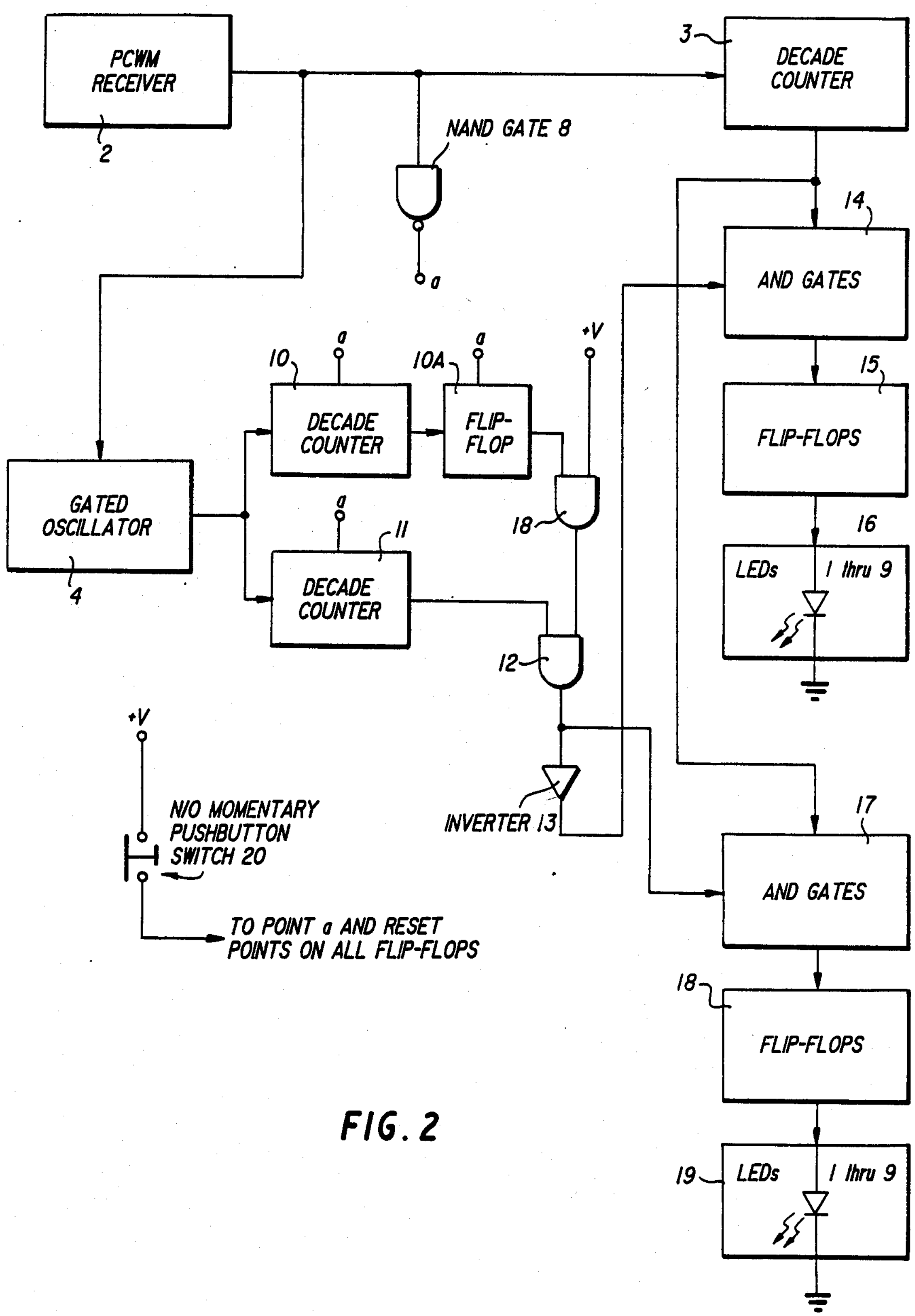
FIG. 2 is a block diagram of a receiver for receiving a code transmitted by the circuit of FIG. 1.

Row one (1) would display readings of narrow width pulses, row two (2) would display readings of the medium width pulses (LED's 16 in FIG. 2), and row three (3) would display readings of the wide pulses (LED's 19 in FIG. 2). The circuit in FIG. 2 is configured such that no lights in row one (1) ever turn on. This means that a no light reading in row one (1) is a yes reading provided that column readings (activated LED's) for rows two and three are also not on. Gated Oscillator 4, which is gated by the coded pulse train from receiver 2, is adjusted in frequency/time period such that the narrow pulses are not counted by Decade Counters 10 and 11. This is because the time period of unit 4's pulse exceeds or will not fit inside the narrow pulses' pulse length in order to be counted. In the event of a medium width pulse in a coded pulse train, Decade Counter 10 sets Flip Flop 10A which in turn outputs into one leg of And Gate 18 (unit 18's other leg is connected to power source tV). However, since Decade Counter 11's output is zero because it is adjusted to read the wide pulses, and its data point output will not have been reached, then AND gate 12's output is zero. Whenever circuit 12's output is zero then Inverter 13's output is high. Therefore, if a pulse being counted by Decade Counter 3, which receives its coded pulse train input from receiver 2, is medium in width and appears at the input of And Gate 14's line (or leg) in coincidence with circuit 13's high output, then a row two (2) light will come on and positionally display where that pulse falls within the pulse train. Row three (3) which records/displays the wide width pulses, is activated anytime circuits 18 and 11 output to AND gate 17 via And Gate 12. Note that Flip Flop Circuit 10A is set and carries the leg of And Gate 18 high each time a count of Decade Counter 10 reaches a level (data point count) that equals or exceeds that which is made by a medium width pulse. Since unit 13's output is zero when unit 12's output is high then LED unit 16, therefore row 2 lights, are not activated during the reading of wide pulses. Circuits 10, 10A and 11 are reset by output from NAND Gate 8 after the reading of each pulse of a coded width modulated pulse train. N/o Monmentary Push Button Switch 20 is used to switch Power Source tV to manually reset all Flip Flops (thus turn off all LEDs) after a reading is made.

To keep FIG. 2 simplified, the following units were not expanded:

(1) Decade Counter 3: has nine (9) data point lines that input to And Gates 14 and 17.

(2) And Gate Units 14 and 17 each consist of 9 And Gates, 1 through 9.

(3) Flip Flop Units 15 and 18 each consist of 9 Flip Flops, 1 through 9, and, (4) LED Units 16 and 19 each consist of 9 LEDs, 1 through 9.

Based on the foregoing, a second and extremely important configuration of the circuit is derived. (Description of circuit operation is provided subsequently in reference to FIG. 3.) By assuming a coded transmitter, for example, has 10 switches, which can be set to either 0 or 1, then it is easily seen that ten different numbers can be read by the 10 lines, i.e.,

| | | | | | | | | | | |
|---|---|---|---|---|---|---|---|---|---|---|
| (1) | 1 | 0 | 0 | 0 | 0 | 0 | 0 | 0 | 0 | 0 |
| (2) | 0 | 1 | 0 | 0 | 0 | 0 | 0 | 0 | 0 | 0 |
| (3) | 0 | 0 | 1 | 0 | 0 | 0 | 0 | 0 | 0 | 0 |
| (4) | 0 | 0 | 0 | 1 | 0 | 0 | 0 | 0 | 0 | 0 |
| (5) | 0 | 0 | 0 | 0 | 1 | 0 | 0 | 0 | 0 | 0 |
| (6) | 0 | 0 | 0 | 0 | 0 | 1 | 0 | 0 | 0 | 0 |
| (7) | 0 | 0 | 0 | 0 | 0 | 0 | 1 | 0 | 0 | 0 |
| (8) | 0 | 0 | 0 | 0 | 0 | 0 | 0 | 1 | 0 | 0 |
| (9) | 0 | 0 | 0 | 0 | 0 | 0 | 0 | 0 | 1 | 0 |
| (10) | 0 | 0 | 0 | 0 | 0 | 0 | 0 | 0 | 0 | 1 |

Figure 3:
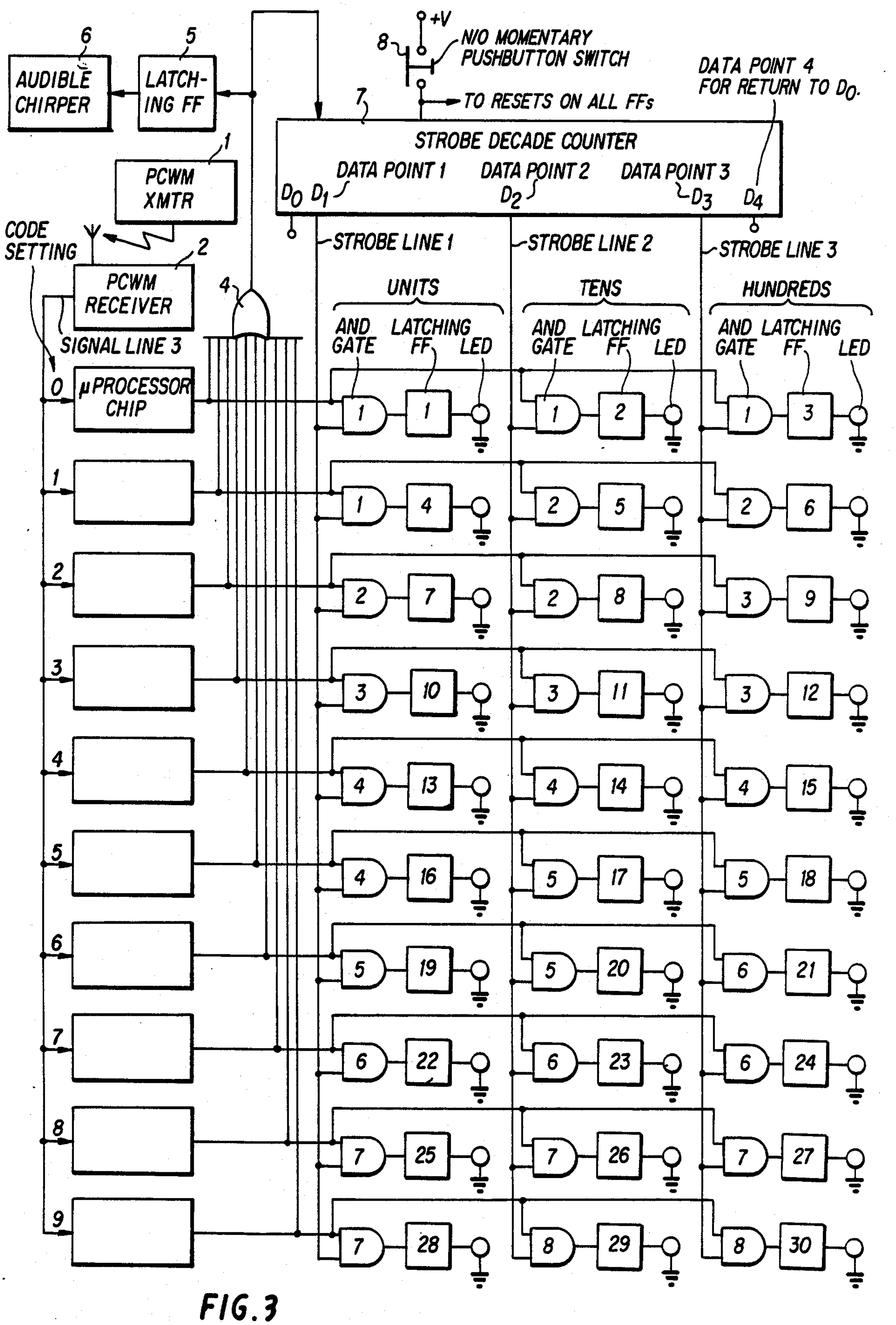
FIG. 3 is a block diagram of another embodiment of the invention showing ten microprocessers for processing transmitted alarm signals.

This arrangement represents a base number of 10 to the 1st power. It follows from this realization that 10 decoder chips, as shown in FIG. 3, could be coded such that each of the 10 could be set to read the above numbers, thereby also providing a base 10 reading capability. Since the hypothetical transmitter has 10 switches which can be set to 0 or 1 in the same arrangement of the above 10 groups of numbers, then by permitting the the transmission of 3 pulse trains, for example, with each of the 3 trains (from the same transmitter) having a different coded signature of 0's and 1's such as (1), (2), and (3) above, then this particular configuration can read $10^3$ or 1,000 different coded numbers in a 3 digit combination. (Description of how to make the same transmitter generate three different pulse trains is provided subsequently with associated reference to FIG. 4.) Such numbers could be 137, 111, 989, 531, etc. For example, using the 10 as a base number, 3 pulse trains gives $10^3=1000$, 4 pulse trains gives $10^4=10{,}000$, 5 pulse trains gives $10^5=100{,}000$, 6 pulse trains gives $10^6=1{,}000{,}000$, or N pulse trains gives $10^N$ possible coded number combinations. Since the time length of the pulse train is a function of the encoder's signal frequency and the RF frequency being coded width modulated, then the length of the pulse/pulse train can be decreased down into microseconds or less (theoretically) thus permitting/extending the reading capabilities of essentially a simplistic circuit/circuit configuration to billions of different coded signals. This situation is easily shown by assuming a transmitter that has, for example, 10 switches each of which can be set to the 10 numerical configurations shown above; and that each switch has a 3 position capability, i.e., low, medium and high. (combinationally, we have; low/medium, low/high, and medium/high). From this, the base number becomes 30, i.e., 3 combinations times 10 switches. If the transmitter is pulsed 10 times, then the transmitter can generate $30^{10}$ different coded 10 digit numbers, i.e.:

| | Switch Setting/Pulse Transmission | | | | | | | | | | Position |
|---|---|---|---|---|---|---|---|---|---|---|---|
| (a) | 1 | 8 | 3 | 5 | 1 | 2 | 7 | 9 | 6 | 3 | Low |
| (b) | 2 | 6 | 3 | 1 | 1 | 2 | 8 | 4 | 5 | 7 | Medium |
| (c) | 8 | 8 | 3 | 6 | 6 | 9 | 9 | 6 | 5 | 1 | High |
| (d) | 8 | 8 | 3 | 6 | 6 | 9 | 9 | 6 | 5 | 1 | Medium |
| (e) | 8 | 8 | 3 | 6 | 6 | 9 | 9 | 6 | 5 | 1 | Low |
| (f) | etc., to $30^{10}$ different configurations | | | | | | | | | | |

Obviously, this concept can be extended ad-infinitum. To be able to read $30^{10}$ different pulse coded width modulated signals, then this circuit configuration would have 30 lines from the FIG. 1 type circuit (derived from 3 configuration positions times 10 switches) or their would be 3-groups of 10 decoders, each set to read the same numerical codings but in the low, medium, high mode settings.

With this enormous, essentially limitless, reading capability, this configuration potentially opens up a new era in communications. For Example, the coded number that is read is also the same address of an addressee or computer storage. By pulsing the transmitter seven times, for example, one is in effect simulating the dialing of numbers as with a telephone. Since the end result of reading pulse doded modulation is reflected in a display of a 1 or 0 or light on, light off, the decoder(s) can be used to translate its readings into binary numbers and sequential tones (3) in terms of a 3 position switch) within a pulse train. The limitless reading capability of the circuit ensures its highly potential use in addressing and retrieving data to and from computer storage in an extremely simplified manner. Most commercial and private establishments such as residential neighborhoods (single blocks of 10 to 30 homes), shopping malls (120 stores with average of 50 monitoring points in each or 6000 total monitoring points) and museums (average of 5000 paintings and/or artifacts) can easily be protected by use of this invention. Given that the invention can determine not only the location of an incident, but also the character of the incident (Help Call, Burglary, Fire, etc.), then its use can be further extended through employment of a simple microprocessor/printer (for recordation purposes) to provide such information as the date, time of incident, type of incident, neighbor's name, address, location, etc. The circuit can also be used: in environmental control systems; to select and turn on surveillance TV/video tape cameras/recorders; and query every security controlled file safe in a building. The applications are monumental and realistic in number and all are made possible through the ability of one circuit and its configurations to read multiple pulse coded width modulated signals. The preferred circuit for implementing the foregoing concept is as follows:

In FIG. 3, the ten microprocessors are each wired by connecting their pins to 0 (0 volts) or V (tV volts) to provide the code settings associated with each of them. For example, each of the nine (9) pins on the first microprocessor is connected to 0 volts or ground to give a code setting of 0 (zero) for it. This code setting corresponds to the nine (9) switches of the encoder/transmitter all being set to the + positions. (In this discussion, the + and − stand for those encoder/transmitter settings that will generate a wide and narrow pulse coded width modulated signal, respectively.) In other words, the second microprocessor with a code setting of 1 (one) matches up with the encoder/transmitter that has switch 1 switched to a negative position, but with all of its other switches set to the + position. This means that the encoder/transmitter's pulse train would generate a wide pulse as its first nine (9) data pulses, but the other 8 (eight) pulses of the pulse train would all be narrow pulses. Furthermore, this means that only the second microprocessor would respond to this particular encoder/transmitter's signal since it is wired to receive only the characteristic pulse train wherein only the first of the 9 data pulses is wide.

From this, it follows that when PCWR transmitter 1 is pulsed the first of three times, PCWM receiver 2 detects and outputs the pulse train onto signal line 3. Since it is assumed that only one switch position of the encoder/transmitter can be negative during any given signal transmission, then one of the microprocessors will be activated. The activated microprocessors will take one leg of each AND gate connected to it high, and pulse the attached line to OR Gate 4, which turns on Audible Chirper 6 via Latching Flip Flop 5. The pulse from Unit 4 also causes Strobe Decade Counter 7 to step from its home Position do to Data Point 1, thereby causing Strobe Line 1 to go high. Coincidence of voltage between the activated Microprocessor and Strobe Line 1 on any two input legs of the AND Gates in the Units column of the electronic matrix will switch on the corresponding LED via its connecting Latching Flip Flop. The second and third transmissions of PCWM transmitter 1 with its specific code settings will cause Strobe Lines 2 and 3, respectively via Data Point 2 and 3 from Unit 7, to go high and switch on the appropriate LEDs in the Tens and Hundreds columns of the matrix.

Switch 8 is connected to power source tV and to Strobe Decade Counter 7. By closing N/O Momentary Push Button Switch 8, Unit 7 is resetted to Home Position $D_o$; all Latching Flip Flops are unlatched; and all lighted LEDs are turned off. It is important to note that the strobing action of Unit 7 is in direct relationship to the pulsing of the Encoder/Transmitter (i.e., the strobe is activated the same number of times the Encoder/Transmitter is pulsed). Of equal importance is the fact that this circuit configuration can be employed to operate on any mode or form of pulse code modulation so long as the microprocessors are designed and programmed to match the codes that are generated by the associated Encoder/Transmitter(s).

Figure 4:
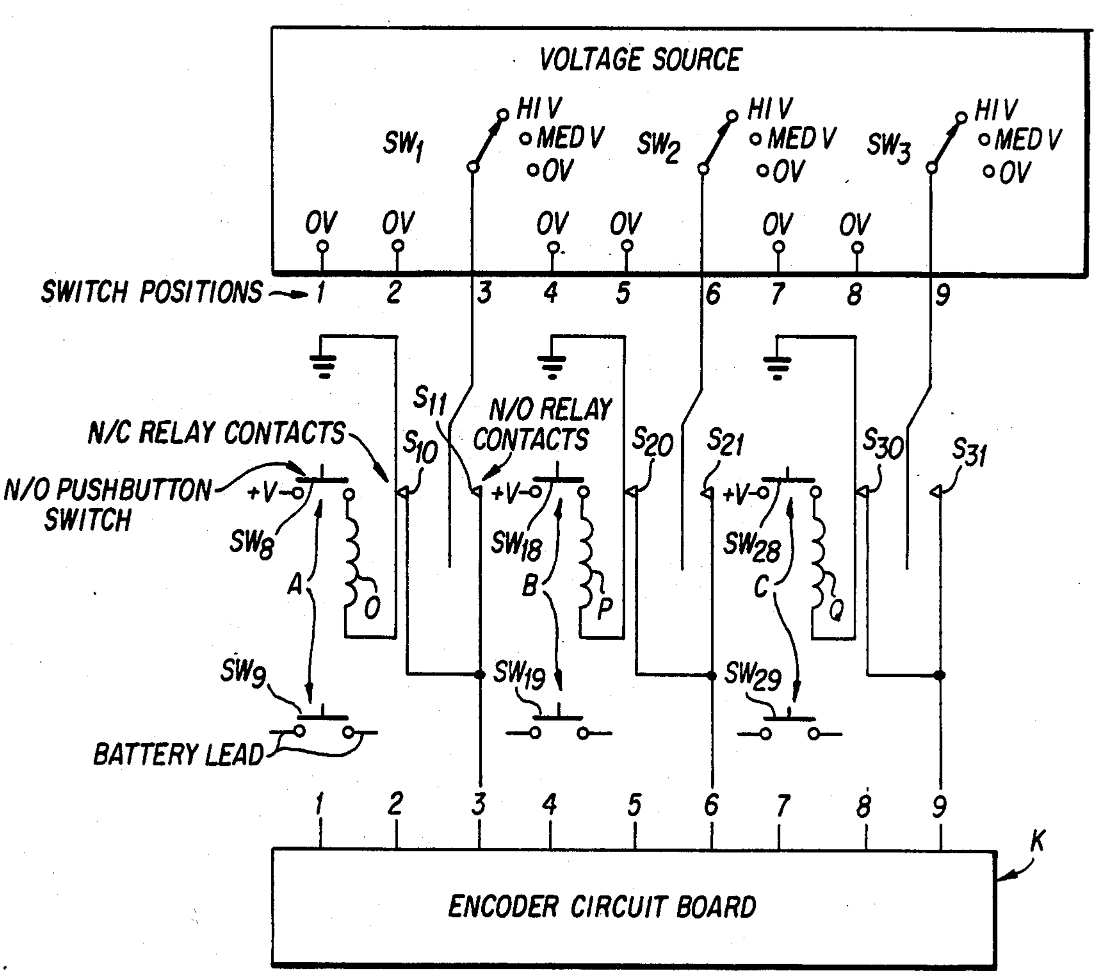
FIG. 4 is block diagram of a code setting circuit for a transmitter.

A description of how to change the codings of a "Fixed Code Transmitter" is as follows:

When in FIG. 4 switch positions 1, 2, 3, 4, 5, 6, 7, 8, and 9 on Voltage Source VS are connected to zero voltage, then the pulse width coded modulated train to be transmitted is:

| | | | | | | | | |
|---|---|---|---|---|---|---|---|---|
| 0 | 0 | 0 | 0 | 0 | 0 | 0 | 0 | 0 |

In quiescent operation: switches $SW_{10}$, $SW_{20}$, and $SW_{30}$ of the Two Pole-Double Throw Relays (TPDT) O, P, and Q are normally closed (N/C); and $SW_{11}$ $SW_{21}$, $SW_{31}$ of TPDT Relays 0, P, and Q are normally opened (N/O). Switches A, B, and C are Two Pole-Double Throw (TPDT) momentary push button. (Single throw shown for drawing simplicity.) Switch positions $SW_8$, $SW_{18}$, and $SW_{28}$ of switches A, B, and C, respectively are normally opened and connect +V voltage to the coils of relays O, P, and Q, respectively. Switch positions $SW_9$, $SW_{19}$, and $SW_{29}$ of switches A, B, and C, respectively, are normally opened and are each connected in series with the main activating switch of the transmitter unit. For simplicity of drawing the circuit in FIG. 4, it is given that switch positions 1, 2, 4, 5, 7 and 8 on Voltage Source VS are electrically connected to switch positions 1, 2, 4, 5, 7, and 8, respectively, on the transmitter pulse encoder unit K.

The quiescent code reading in FIG. 4 for the transmitter unit is, as mentioned above:

| | | | | | | | | |
|---|---|---|---|---|---|---|---|---|
| 0 | 0 | 0 | 0 | 0 | 0 | 0 | 0 | 0 |

By depressing switch A, relay 0 is activated causing switch $SW_{11}$ contacts to close, thereby applying a high voltage (lets say +6.8 volts) to switch position 3 on Encoder Circuit Board K. Depression of switch A also, simultaneously, causes the transmitter unit to activate and transmit its first coded signal which is:

| | | | | | | | | |
|---|---|---|---|---|---|---|---|---|
| 0 | 0 | 1 | 0 | 0 | 0 | 0 | 0 | 0. |

This coding derives from the fact that all positions on unit K are at 0 voltage except for position 3, which is at +6.8 volts. When switch A, which is momentary push button in terms of mechanism, is relreased, then relay coil 0 is de-energized thereby causing $SW_{10}$'s contacts to close and $SW_{11}$'s contacts to open. In other words, this action (releasing switch A from a depressed state) returns the transmitter unit back to the quiescent code mode of:

| | | | | | | | | |
|---|---|---|---|---|---|---|---|---|
| 0 | 0 | 0 | 0 | 0 | 0 | 0 | 0 | 0. |

By depressing switch B, +6.8 volts are applied to point 6 on circuit K. This action causes the transmitter unit to transmit a code of:

| | | | | | | | | |
|---|---|---|---|---|---|---|---|---|
| 0 | 0 | 0 | 0 | 0 | 1 | 0 | 0 | 0. |

The release of switch B allows the code mode to return to:

| | | | | | | | | |
|---|---|---|---|---|---|---|---|---|
| 0 | 0 | 0 | 0 | 0 | 0 | 0 | 0 | 0. |

By depressing switch C, +6.8 volts are applied to point 9 on unit K. This action results in the transmitter unit transmitting a code of:

| | | | | | | | | |
|---|---|---|---|---|---|---|---|---|
| 0 | 0 | 0 | 0 | 0 | 0 | 0 | 0 | 1. |

Quick review of the three codes produced, shows that the one (1) in the first transmission is in the 3rd bit or digit position and that the one (1) in the 2nd and 3rd transmissions occupy the 6th and 9th positions, respectively, in the coded patterns. In other words, the number 369 was generated by activating the transmitter unit three (3) times, using the circuit in FIG. 4. Obviously, in the context of the explanation of operations given, 9 different combinations (8 in addition to the above) of the 3 numbers can produced (i.e., to say: 693, 396, 639, 936, 963, 333, 666, and 999).

It is important to note, in terms of sequence, that the first transmitter's transmission produces the hundreds position digit, and the second and third transmissions generate the tens and units digits positions. By reviewing FIG. 3 and its companion explanation, then it becomes obvious, with the above treatise, as to how the configuration can be made to generate and read 1000 different numbers. Moreover, it becomes evident that 10 thousand, 100 thousand, 1 million, 10 million, 100 million, 1 billion, 10 billion, etc., numbers can be generated, through circuitry shown in FIG. 4, by pulsing the transmitter unit 3, 4, 5, 6, 7, 8, 9, 10 times, respectively, etc. In these situations, the monitor circuitry in FIG. 3 needs only to provide additional strobe lines from the counter and the appropriate column of LEDs to decipher the large numbers afforementioned.

Figure 4A:
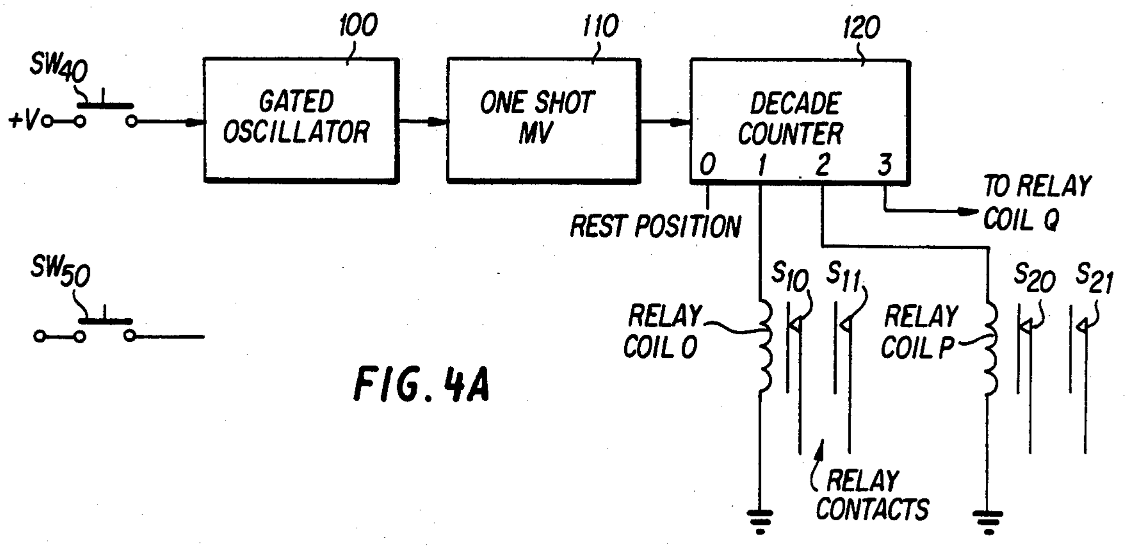
FIG. 4*a* is a block diagram showing circuitry for transmitting the code set by the circuitry of FIG. 4.

Sweeping out two, three, or any number of transmitter transmissions automatically, is easily accomplished by employing Gated Oscillator 100, one-shot multivibrator 110 and Decade Counter 120 as configured in FIG. 4A. By depressing N/O momentary push button switch SW$_{40}$, Gated Oscillator 100 (in which its frequency time period exceeds 1 178 to 2 times the transmitter's coded train period), and one-shot multivibrator 110 are activated. Circuit 110 feeds a pulse (in which the pulse length is 1 $\frac{1}{2}$ to 2 times the transmitter's coded train period) into Decade Counter 120. This causes circuit 120 to step from its reset (0) position to its first data point position, causing the coil of relay 0 to be activated. As in the preceding explanation given for FIG. 4, SW$_{10}$'s contact opens and SW$_{11}$'s contact closes. When SW$_{11}$'s contact closes, then, as previously explained above, +6.8 volts are applied to switch position 3 on circuit K, thereby causing the transmitter (which is assumed to be activated simultaneously with the depression of SW$_{40}$, i.e., SW$_5$) to transmit the code of:

| | | | | | | | | |
|---|---|---|---|---|---|---|---|---|
| 0 | 0 | 1 | 0 | 0 | 0 | 0 | 0 | 0. |

The automatic sweep continues through similar data points of circuit 120 by driving the assumed coils of relays P and Q in FIG. 4. The 4th data point position on circuit 120 can be used, in the case of automatically generating three numbers, to negate or stop Gated Oscillator 100 from oscillating, thereby restricting the coded signal transmission generated by the transmitter unit. Obviously, the transmitter unit will cease operation essentially immediately after the release of switch combination SW$_{40}$ and SW$_{50}$. However, Decade Counter 120 must always be resetted manually or automatically, to ensure the appropriate sequence of coded pattern generation.

Figure 5:
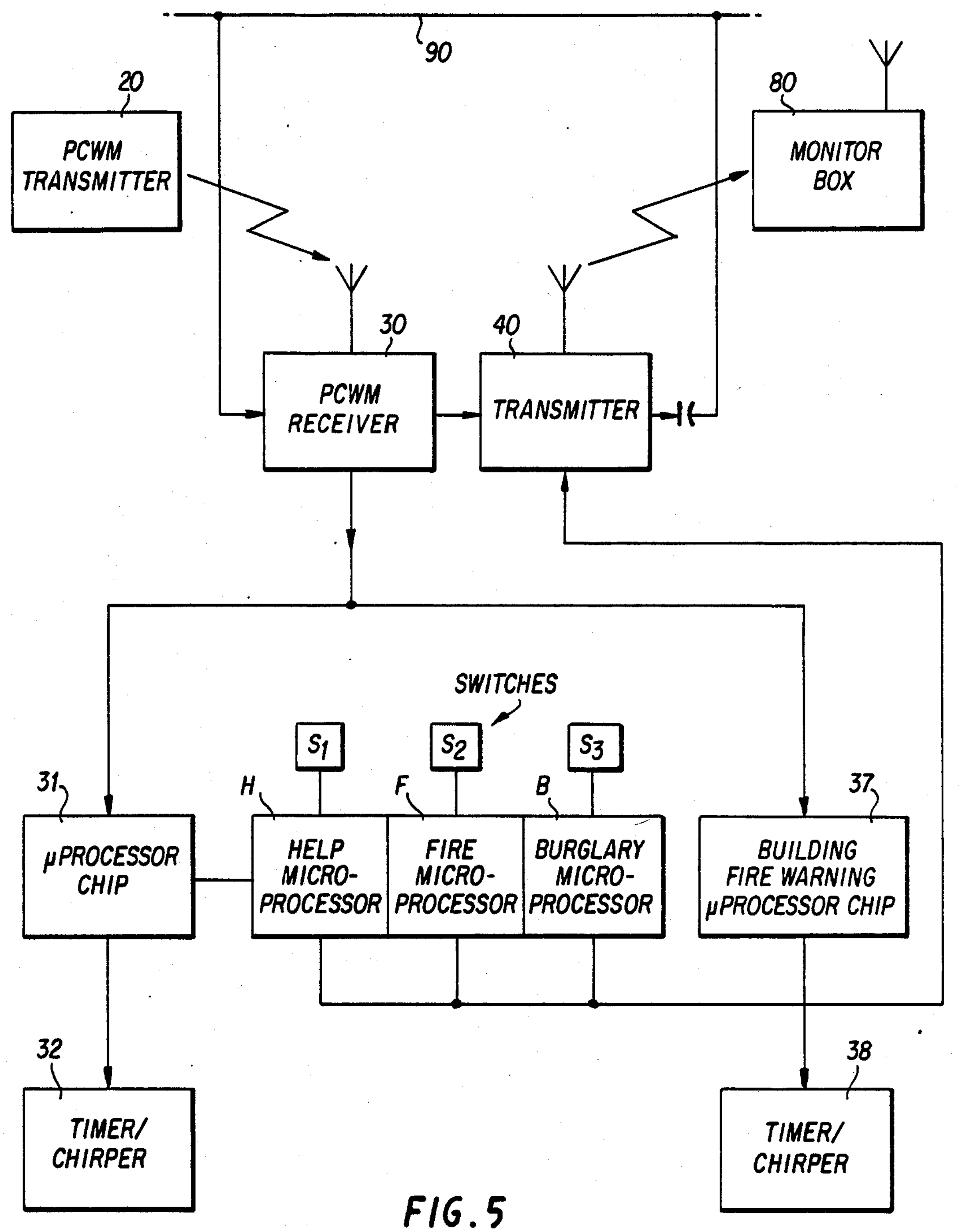
FIG. 5 is a block diagram of a transmitter and receiver system in accordance with the instant invention which might for example be used in a "neighborhood watch program".

Signal Relaying. Relay of the coded pulse width modulated pulse train throughout a neighborhood, hotel, museum, apartment building, etc., is accomplished by extracting the signal from the receiver, tuned to the transmitter, prior to pulse decoding. This signal is used to modulate the carrier frequency of a transmitter which is turned on continuously. This transmitted signal is received by a receiver that's, lets say, located in the adjacent house. Output of the receiver, as explained above, is used to modulate the carrier frequency of the second transmitter. Such a scheme, therefore, lends itself to relaying the pulse train throughout a confined environment. FIG. 5 shows an example of how the signal relay units would work in a practical situation. It is important to note that this scheme would normally be employed if the transmission distance capability of the transmitter or the receiver's reception sensitivity were inadequate. Such limitations, obviously, could also be resolved through use of more costly equipment such as wide-band, high sensitivity receivers and medium/high power walkie talkie(s). By providing proper electrical isolation (including radio frequency interference filters) and carrier frequency of a wide-band intercom system, for example, the coded pulse width modulated pulse train can be transmitted over and received from the electrical wiring of a school, hospital, warehouse, hotel, museum, etc. It is important also to note that the transmitter's coded signal can be transmitted and received in a non-radio frequency mode. This is accomplished by connecting the pulse train directly out of the encoder to telephone wiring (a lead wire in addition to ground) that's common throughout a multistory building, for example. The circuit simply reads the code from this line.

In FIG. 5, lets assume that a home owner in a neighborhood watch program activates transmitter 20. Output of receiver 30 modulates the unmodulated carrier of transmitter 40, which is on continuously. Transmitter 40 simply retransmits the coded signal of transmitter 20 to the receiver (similar to receiver 30) in the adjacent or next participating house. Circuit monitor box 80 receives the signal and identifies the house from which the signal originated. Monitor box 80 transmits a confirm signal code, after reception of the signal, which activates confirm code microprocessor chip 31 and timer/chirper circuit 32 via circuit 30. The audible chirping alerts the home owner that the original alarm signal had been received/acknowledged by circuit 80. Similarly, if a fire is taking place in the neighborhood or an apartment building, a general alarm coded signal can be transmitted by monitor box 80. This signal will activate building fire warning microprocessor chip 37 and timer/chirper circuit 38 via receiver 30. By assigning codes C1, C2, and C3 to be coded (non-RF) transmitter microprocessor chips H, F, and B respectively, (where H=Help, F=Fire, and B=Burglary) then a home dweller can communicate the character of an incident. The $S_1$, $S_2$, and $S_3$ boxes in FIG. 5 simply represent switches, which, when depressed, cause the associated help, fire, or burglary circuits to modulate transmitter 40, which relays the message along the relay stations to monitor box 80. Microchips F and B can be connected to different type fire and burglary sensors and the chirpers in FIG. 5 could easily be replaced by sirens and/or bells. By setting microprocessor chip B, with code C3, the same code as transmitter 20, the home owner would have a panic/burglary warning system. Telephone line 90 provides a very viable means for conveying the coded signals as a alternative to using radio signal transmission/reception modes.

Figure 6:
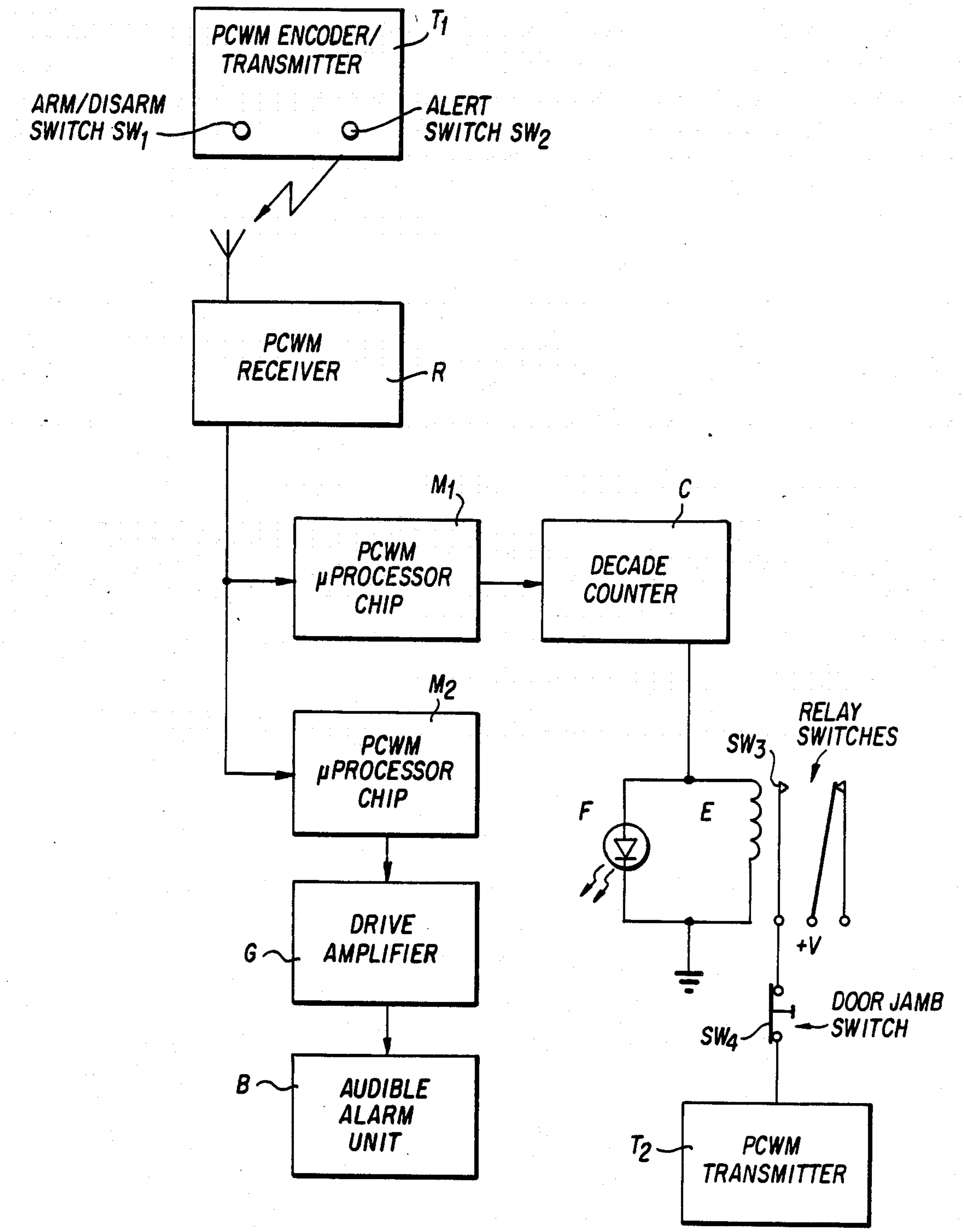
FIG. 6 is a block diagram showing a circuit for an arm/disarm function.

Toggle Arm/Disarm Security Unit/ Through use of the circuit in FIG. 6, it is possible to arm or disarm an entire security system installed in a store, bank, private residence, etc., via means of coded radio signal transmission. FIG. 6 depicts a simple scheme that can perform the arm/disarm function. Depression of arm/disarm switch SW1 on transmitter T1 causes T1 to transmit a coded signal to receiver R, which detects the signal and feeds it to pulse coded width modulated (PCWM) microprocessor chips M1 and M2. If T1's code matches that of M1's code setting then 2-position Decade Counter C is activated, thereby activating relay coil E. Activation of relay coil E causes its associated normally opened (N/O) switch SW3 to close. Door jam switch SW4, for sake of description, is assumed to be physically/electrically situated in the main door of a bank. If the bank door is opened when SW3 is closed or armed then +V voltage is fed through SW3 and SW4 to transmitter 2, which will transmit its precoded signal via radio mode and/or a dedicated telephone line. Depression of arm/disarm switch SW1 again after the first depression, causes 2-position Decade Counter C via circuits R and M1 to switch to the O data position, thereby de-energizing relay coil E and LED F. As a result of this action, switch SW4 can be opened or closed without causing the activation of transmitter 2 because the unit would then be in the disarm mode of operation. Depression of alert switch SW2 on transmitter T1 causes T1 to generate a code which matches that of M2, thereby causing the bell, siren or audible units B to activate via Drive Amplifier G. It is important to note that transmitters T1 and T2 can both have the same codes thereby causing the same action as that initiated by depression of SW2 on PCWM Encoder/Transmitter T1.

Figure 7:
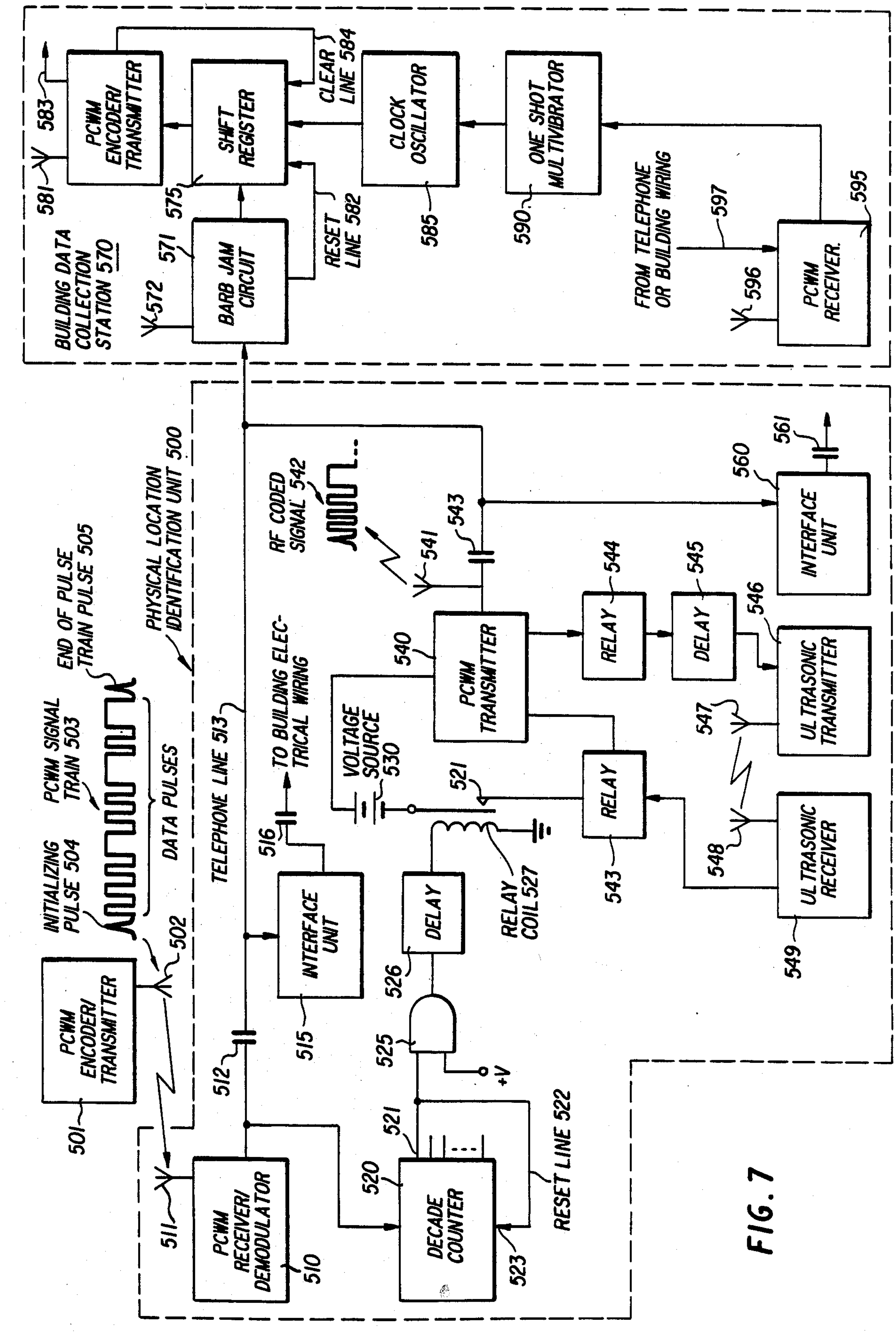
FIG. 7 is a block diagram of a pulse-width modulating system in accordance with the principals of the instant invention in combination with a physical location identification unit and a building data collection station.

Referring now to FIG. 7, the location of an individual/sensor or object that sounds a security violation alert is identified in accordance with the following technique. When Pulse Coded Width Modulation (PCWM) Encoder/Transmitter 501 is activated, it radiates PCWM 503 radio frequency or ultrasonic signal via Antenna 502 and is received by Physical Location Identification Unit 500. Specifically, PCWM Receiver/-Demodulator Unit 510, (contained in unit 500 which represents all such units located at predetermined locations throughout a building structure), receives its signal via Antenna 511. PCWM Signal 503, which symbolizes the signal signature of a specific code assigned to an individual being protected, is simultaneously fed onto Telephone Line 512, which is common to 510 type units in a given building, and to Decade Counter 521. Capacitor 512 is simply an isolation component and Interface Unit 515 shows that code signal 503 could also, if desirable, be communicated, via Capacitor 516, through the building's electrical wiring system. Decade Counter 520 counts the data pulses of PCWM Signal Train 503, excluding the Initializing Pulse 504 and end of Pulse Train Pulse 505. On the 9th pulse, lets say, unit 520 outputs a pulse from point 521 (the 9 count line) into one leg of And Gate 525. On the 9th pulse count, Decade Counter 520 is resetted from the pulse from 521, sent to reset point 523 via Reset Line 522. When Relay Coil 527 is activated via Delay Unit 526, Relay 527's contacts 531 (normally opened (N/O)) closes thereby applying power from Voltage Source 530 to PCWM Transmitter 540 via Relay Unit 543 (whose contacts are assumed to be normally closed; (N/C)). Activation of 540 causes Relay 544 to close its assumed normally opened contacts, resulting in Ultrasonic Transmitter 546, via Delay Unit 545, transmitting a signal via Antenna 547. This signal is recieved by Ultrasonic Receiver 549 via Antenna 548, thereby causing the N/C contacts of Relay 543 to open. When this happens, PCWM Transmitter 540 ceases to transmit due to the break in the series circuit containing Voltage Source 530. This scheme prevents more than one PCWM Receiver/-Demodulator Unit such as 540 from simultaneously transmitting their respective location codes, thereby causing errors in readings at the Building Data Collection Station 570. The philosophy here is that whichever of the PCWM Receiver/Demodulator Units placed throughout the building that receives the signal first, will temporarily nullify transmissions of the other PCWM Transmitters located in proximity to the alert signal. This is seen by assuming unit 510 is the first to receive, in terms of nanoseconds, a security alert signal with the understanding that two other such units in the nearby vicinity were perhaps also activated. When PCWM Transmitter 540 activated unit 546 which ultimately causes Relay 543 normally closed contacts to open, the series loop containing Voltage Source 530, as previously explained, is broken. Note, however, that PCWM Transmitter has (as assumed) already transmitted its coded signal before the series loop is broken because of the signal delay provided by Delay Unit 545. By providing a delay time difference of one (1) second among each of the three assumed Physical Location Identification Units such as in Delay Unit 545, then transmission of signal by the other two units is inhibited because the relay contacts in their series loop will open before their PCWM Transmitters can transmit. It is important to note that the time delay difference between Delay Unit 526 and the other two assumed activated Physical Location Identification Units makes the signal inhibit action possible. Delay Unit 545 in each Physical Location Identification Unit serves the very important function of preventing the PCWM Transmitters such as unit 540 from negating their own transmissions. In other words, if Delay Unit 545 were not included in the circuit, then as soon as PCWM Transmitter 540 would start to transmit, the seris loop line would open up instantaneously as a result of unit 549 receiving its signal from unit 546 with no appreciable delay. The output of unit 540 can be transmitted either from Antenna 541 as RF coded Signal 542 and/or through Capacitor 543 (as modulator pulses) onto Telephone Line 513. Obviously, unit 540's signal could also be transmitted in RF and/or ultrasonic form over the building's electrical wiring system via Interface Unit 560 and connecting Capacitor 561.

In the Building Data Collection Station 570 in FIG. 7, the circuit 571 as shown in FIGS. 1, 2, and 3, would be employed, depending on the number of codings/location identifiers/configurations used, to receive PCWM Transmitter 540's signal via Antenna 572 if RF relay stations in FIG. 5 are used, or by Telephone Line 513, or via the building's electrical wiring system. It is assumed in the context of explaining system operations, as shown in FIG. 7, that unit 571 would receive and read only two signals. The first would be the individual's assigned code which originates from PCWM Encoder/Transmitter 501 thereby disclosing "Who sounded the Alert." PCWM Transmitter 540's location number code is the second signal received and read by unit 571, thereby establishing the "Where" part of the identification process. Shift Register 575, lets say, a parallel 9-bit unit, first registers in memory the individual's assigned code, and immediately resets unit 571 via Reset Line 582 in preparing for receipt of the location code from unit 540. Having registered the two codes, station 570 awaits to be polled or queried via PCWM Receiver 595 and its Antenna 596 by some master station through commonly known matching signal coding techniques. That is to say, when unit 595 receives through its Antenna 596 a PCWM signal which matches the preselected internal code settings for PCWM Receiver 595, then and only then will unit 595 activate One Shot Multivibrator 590. Activation of unit 590 gates on Clock Oscillator 585 for a time duration dictated by the pulse length of unit 590. Assuming under this condition that two clock pulses would be generated by unit 585, then Shift Register 575 would be caused to shift its first and second set of code readings, respectively, into PCWM Encoder/Transmitter 580 for transmission via Antenna 581 (for RF signals) or Line 583 (symbolizing signal transmission via telephone line or the building's electrical wiring system) in response to the polled signal received by PCWM Receiver 595. It is important to note that Shift Register 575's output, which would be in the form of, lets say, +6 volts, +5.2 volts or 0 volts, serves as the encoder voltage settings for unit 580 thereby providing a one to one correspondence between the codes received from units 510 and 540 versus what's to be transmitted by unit 580. Line 597 simply shows that PCWM Receiver 595 could receive its activating signal, as an alternative to RF reception, via the telephone line and/or the building's electrical wiring system. The building's overall identifying code is permanently encoded in Shift Register 575 such as in Read Only Memory (ROM) and is not cancelled during the clocking process as would be the individual's and location identifying codes as accomplished by Clear Line 584 after each data transmission effected by unit 580.

Figure 8:
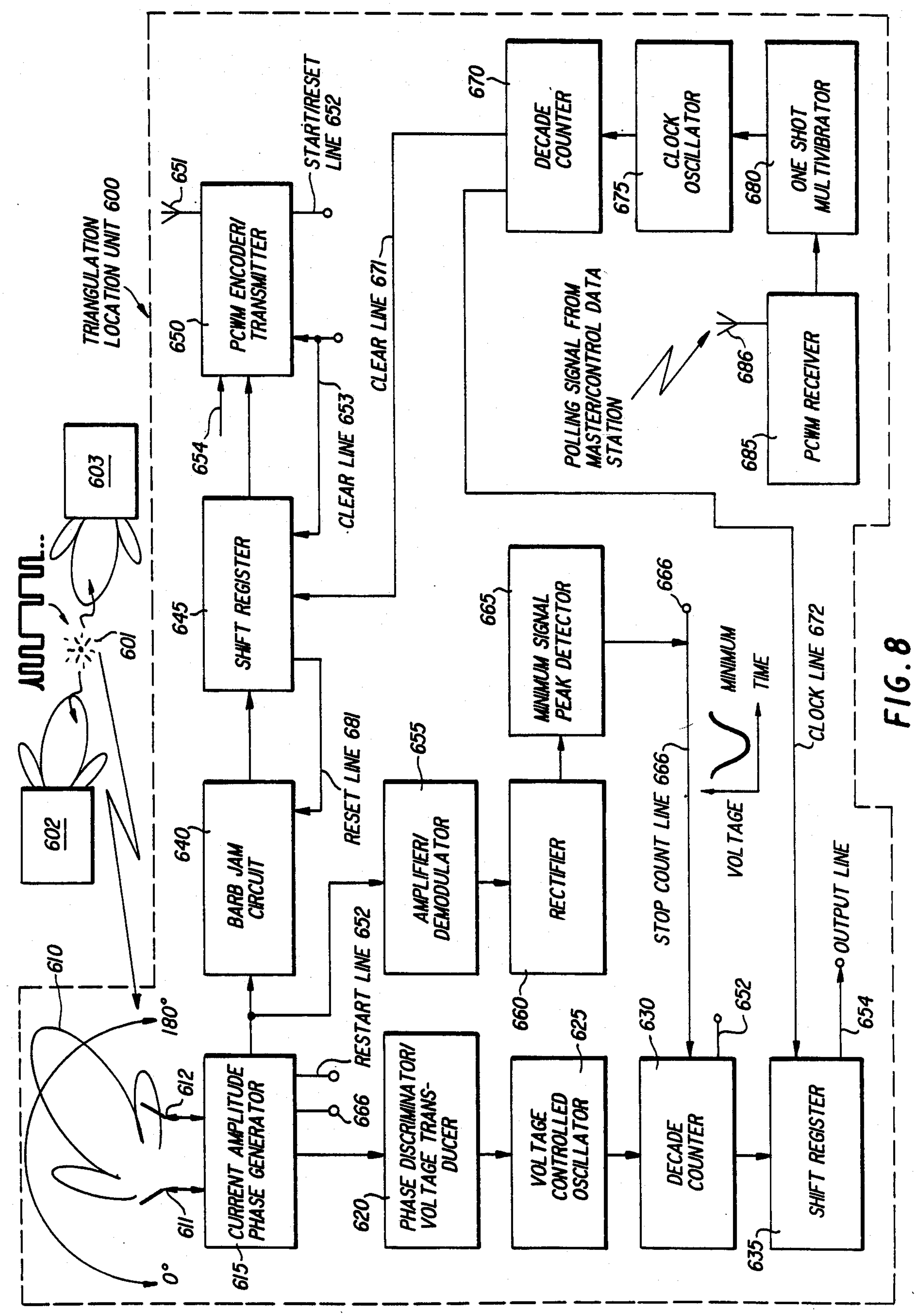
FIG. 8 is a block diagram showing a pair of directional antennas utilized to accomplish the principals of the instant invention.

The determination of "who" activated the security alert and "where" he or she is located outside a building structure such as an outside parking lot is as follows:

Event 601 (X) symbolizes the short burst existence of a PCWM Encoder/Transmitter radio frequency signal. Triangulation Location Unit 600 represents the means in FIG. 8 whereby the "who" and "where" can be determined. Units 602 and 603 are replicas in systems operation to detailedly diagramed unit 600; and all three units 602, 603, and 600, collectively, provide the triangulation system for determining location of the individual who sounded the alert. As will be subsequently explained, the data outputs of these three units are ultimately fed to a microprocessor or microcomputer which is programmed to compute and display location information.

Antenna Pattern 610 is electronically steered by Current Amplitude/Phase Generator 615. This is accomplished by unit 615 varying the current amplitude and phase of electrical energy fed to antenna elements such as Antenna Elements 611 and 612. It is assumed in the context of this explanation that unit 615 has the drive capacity to cause Antenna Beam 610 to be steered back and forth between and including 0° to 180° in azimuth direction. Signal 601 is received, read, and deciphered for two types of information, namely: identification coding and signal strength. The individual who activated the alert is determined by signal 601 being fed to the Circuit 640 via components 610, 611/612, and 615. Unit 640's output which is in one to one signature correspondence with the alert signal is fed to Shift Register 645, which thereafter resets Circuit 640 via Reset Line 641 in preparation to receive another signal if necessary. Shift Register 645 feeds its data to PCWM Encoder/Transmitter 650 in the form of encoder level voltages which determines the PCWM code which would be transmitted by unit 650 via Antenna 651. Current Amplitude/Phase Generator 615 drives Phase Discriminator/Voltage Transducer 620, which simply provides a one to one, synchronized correspondence between signal phase in degreees and voltage. For example, 0° to 180° would correspond to 0 volts to 18 volts with 0°/0 volts and 180°/18 volts occurring in coincidence and the interval degree/voltage relationship occurring linearly/proportionately. Voltage Control Oscillator 625 generates its signal frequency in direct relation to the voltage fed to it from unit 620. Decade Counter 630 counts the frequency pulses fed to it by unit 625, and stops counting when it receives the stop count signal from Minimum Signal Peak Detector 665 via Line 666. Peak Detector 665 is designed to detect the minimum (or most negative) voltage swing via Amplifier/Demodulator 655 and Rectifier 660 as associated with the signal resulting from the most minimum minor lobe detection of Antenna Pattern 610. It is to be noted that the steering speed or frequency of Antenna Pattern 610 as caused by unit 615 is much less in time period than the time length of the PCWM pulse train resulting from the occurrence of Event 601. Since Decade Counter 630's frequency count is directly correlated with the azimuth direction of Antenna Pattern 610, then its count which is fed to Shift Register 635 indicates the accurate direction/location of Event 601. Shift Register 635 also contains the permanent identification code of System 600, and, as in the case with Shift Register 645, its output of location code, which corresponds directly to the direction of alert count from unit 630, is clocked sequentially via Clock Line 672 by Clock 675 in the appropriate transmission sequence as determined by Decade Counter 670. Similarly, Clock Line 671 actuates Shift Register 645 to input its identification code into 650 for transmission. Unit 635's output is fed into 650 via Output Line 654. Therefore, PCWM Encoder/Transmitter 650 simply transmits: (1) The identification code for the individual "Who" sounded the alert; (2) the PCWM coded signal which corresponds to the direction of Event 601; and (3) the PCWM location code assigned to System 600. Start/Reset Line 652 is activated by a short pulse that is generated by PCWM Encoder/Transmitter 650 at the end of its three signal transmission (all of which would occur in a very small fraction of one second). This Line (652) is employed to restart the operation of unit 615 simultaneously with resetting Decade Counter 630, thereby re-initializing it for normal unit operation. Decade Counter 630 is automatically resetted to zero when the voltage, and, therefore, frequency are returned to zero as a result of the synchronized outputs of units 620 and 625, respectively. Reset Line 641 resets Circuit 640 after each signal reception by 640, and Clear Line 653 from 650 clears unit 645 after 650 completes its full transmission cycle. Data transmission by 650 is initiated when PCWM Receiver 685 receives a polling or query via Antenna 686 from a Master Data Collection Station. When unit 685's code is matched to the polling code, then 685 causes Clock Oscillator 675 to pulse three times as determined by 680's pulse length. This action causes Decade Counter 670 to advance Shift Registers 635 and 645 outputs to 650 at the appropriate time and in the proper sequence.

Figure 9A:
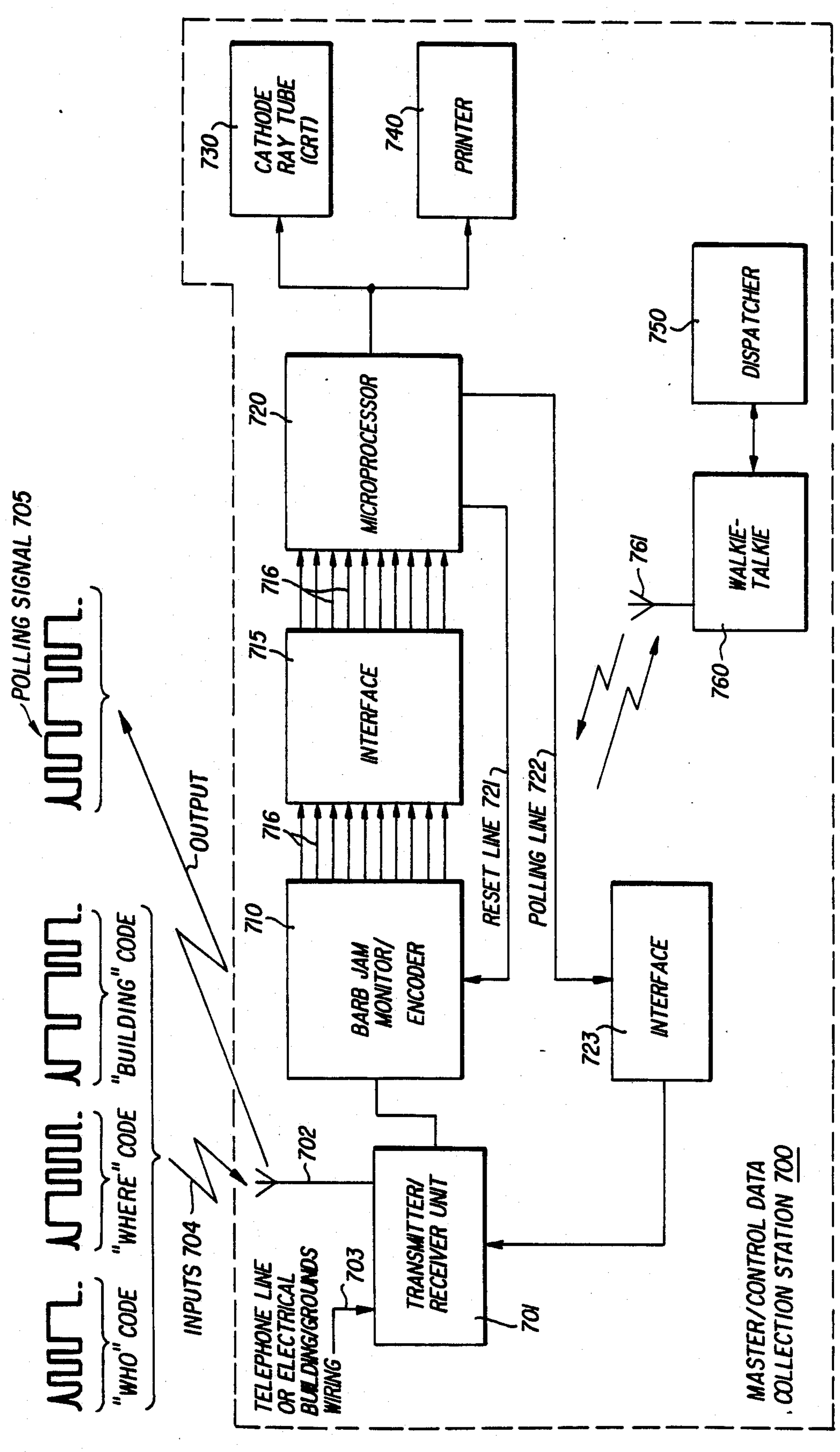
FIGS. 9A and 9B are a block diagrams showing the system in accordance with the instant invention incorporating a "who" code, a "where" code, and "building" code.
Figure 9B:
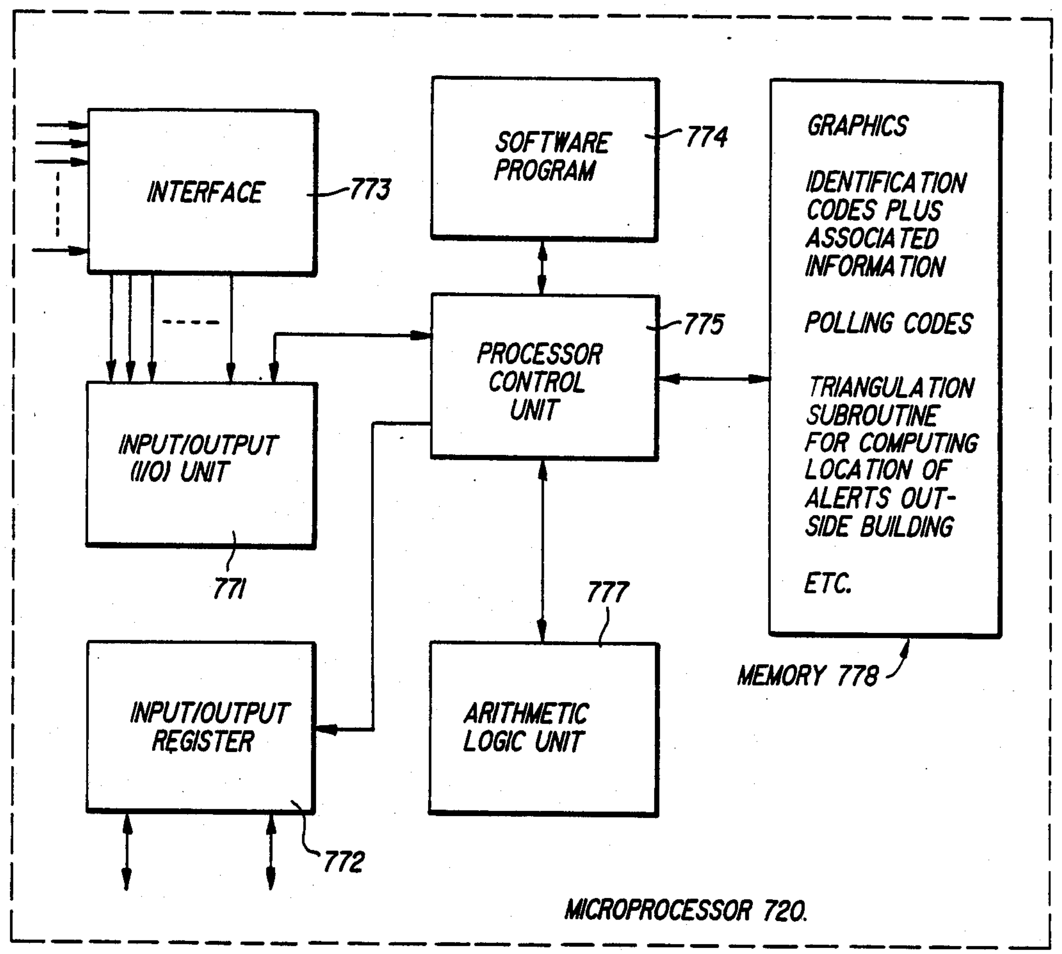

FIG. 9 shows the component parts of the Master/-Central Data Collection Station 700. Its primary and most important functions are to: (1) Determine "Who" by name sounded the alert; (2) "Where" he or she is located; and (3) facilitate communications directly with the action authorities, thereby enhancing the response time of those authorities closest to the security alert event.

Operations are as follows: Transmit/Receiver 701 receives its data Input 704 and poll/query its data collection stations via Antenna 702 with PCWM RF signal 705. The data that are received is obtained by Microprocessor 720 sequencing its polling, PCWM simulated signals, into unit 701 via Polling Line 722 and Interface Unit 723. Units 720 and 701, in consort, poll each builing/tunnel structure sequentially within a given secured complex and then poll each data collection system as symbolically shown in FIG. 8. The complete polling can be accomplished in less than one second. If an alert signal is being held in a shift register in any building/tunnel or data collection station, then the polling PCWM signal will activate the polling receiver at that location thereby causing the affected PCWM Encoder/Transmitter to transmit or dump its data to Master Station 700. The affected buildings will transmit the PCWM signals corresponding to "Who" sounded the alert and "where" the individual is located. Also, the permanent PCWM code assigned to the building will be transmitted. Similarly, for those polled triangulation location data collection stations affected, the PCWM codes for the "Who" activated the alert, and the physical location of the event will be transmitted to the Master Station. Through transmit/receive switching hardware a listening period is allowed after each polled point to allow for data dump. Those signals that are received in response to polling are all read by the Monitor/decoder 710 and fed to Microprocessor 720 for processing. Set/Reset signals for unit 710 are provided by Microprocessor 720, which is shown in detail in FIG. 10. Through software design, Microprocessor 720 is programmed to store, in memory, the digitized data for: (1) Each PCWM code used in direct relation with the name of the individual assigned the code, (2) Building and data collection station codes in direct relation to their physical location, (3) Mathematical routine for calculating the location of an alert event that takes place outside building/tunnel structures through triangulation and (4) Graphics of buildings (floors, corridors, etc.) and grounds to the extent that they are brought up on Cathode Ray Tube (CRT) 730 for a graphical display with the employment of a flashing cursor on the CRT to indicate the location of the security alert.

Figure 10:
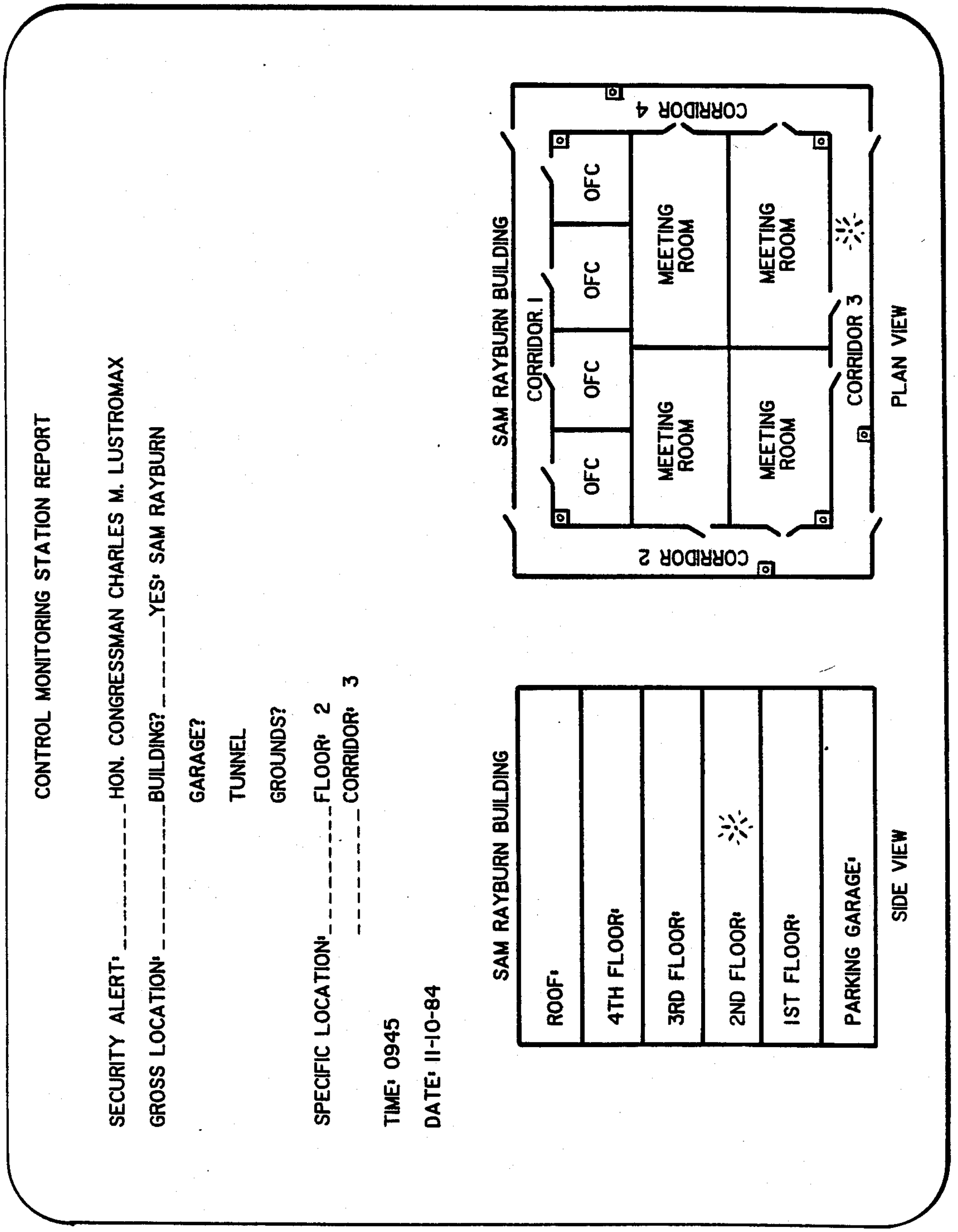
FIG. 10 is a chart illustrating a central monitoring station report.

The PCWM signals read by unit 710 through Interface Unit 715 (with voltage levels of 716) determine what information to bring up-on CRT 730 and what information to print out on Printer 740. More specifically, unit 715 is the necessary hardware that will connect, lets say, the 9 lines from Monitor 710 to Microprocessor 720. These lines will be high, medium, or low in voltage level (see FIG. 2) in direct correspondence to the coding, lets say, of the individual person assigned a given code. Among other things, Microprocessor 720 will have stored in its memory the signatures of, for example. over 20,000 codings that would include those assigned to: individual people, sensor (alert, fire, burglary, etc.) locations, buildings, data collection stations and polling. By sensing the sample voltage patterns at its input as shown in FIG. 9, Microprocessor 720 accesses through preprogrammed software the non-destruct memory location containing digitized information such as names of individuals, data collection stations, buildings, graphics, etc., that are associated with the coded voltage pattern at its input. Things such as the time and date of occurrence of an event are supplied by Microprocessor 720. It is well within the existing state-of-the-art technology to program Microprocessor 720 to cause all such information plus more to be formatted and written on the face of Cathode Ray Tube 730 and, through simple print commands, printed out on Printer 740. A self explanatory format that can appear on CRT 730 is shown in FIG. 10. Upon receipt of a security alert at the Master Collection Station Console, which would incorporate the various component units shown in FIG. 9 and would be no larger than a typical desk top microcomputer, Dispatcher 750 (one person for example) would alert the action authorities through two-way communications afforded by Walkie Talkie 760 and Antenna 761. It is assumed that an audible chirping and flashing light circuit are incorporated in Monitor 710 to alert the Dispatcher 750 of a security alert event. Existing technology allows for the Master Collection Station to be completely automated (that is to say, have no human intervention such as a dispatcher). This is simply accomplished by programming into Microprocessor 720 the appropriate voice encoded information that is associated with each PCWM code assigned throughout a given defined security system.

Line 703 shows that the alert signal, as an alternative to total Radio frequency (RF) Communications, can be fed into Master/Central Data Collection Station 700 via telephone lines and/or electrical circuit wiring. Reset Line 721 is controlled by Microprocessor 720 and is used by unit 720 to reset Monitor 710 immediately after each in-coming bit of information is received by unit 720. Unit 710 receives and feeds to unit 720 via Interface Unit 715 one pulse train of information at a time and is resetted or cleared for reading of the following pulse train after being activated by unit 720 via line 721. The time duration between PCWM pulse trains can be easily adjusted such that Monitor 710 will have no problem in keeping pace with the required reading repetition rate. Polling Line 722 is used to convey the sequences of stored polling codes to Transmit/Receiver Unit 701 via Interface 723. The function of unit 723 is very important in that it converts Microprocessor 720's codes into the PCWM type codes for encoding unit 701, and activates or causes unit 701 to transmit at the appropriate time.

Display 770 in FIG. 9 is a simplistic, exploded view of component parts and functions, in the context of this invention, of Microprocessor 720. All of the information to be used and acted upon is digitized and stored in unit 720's Memory 778. It is assumed that Software Program 774 is written such that unit 720 is instructed via Processor Control Unit 775 on what operations to perform when a certain PCWM code signal appears at its input via Interface 773 from unit 715. The input/output unit 771, I/O Registers 772 and Arithmetic Logic Unit 777 are controlled by Processor Control Unit 776 and output their information to the "Outside World" on CRT 730 and/or Printer 740 units.

In this invention, it is assumed that all major component units are Alternating Current (A/C) as the primary source of power, and employ rechargeable batteries as backup. The miniature portable PCWM Encoder/-Transmitters, as shown in FIG. 7, will be outfitted with rechargeable batteries with appropriate jacks to facilitate periodic charging from "A/C House Current."

Figure 11:
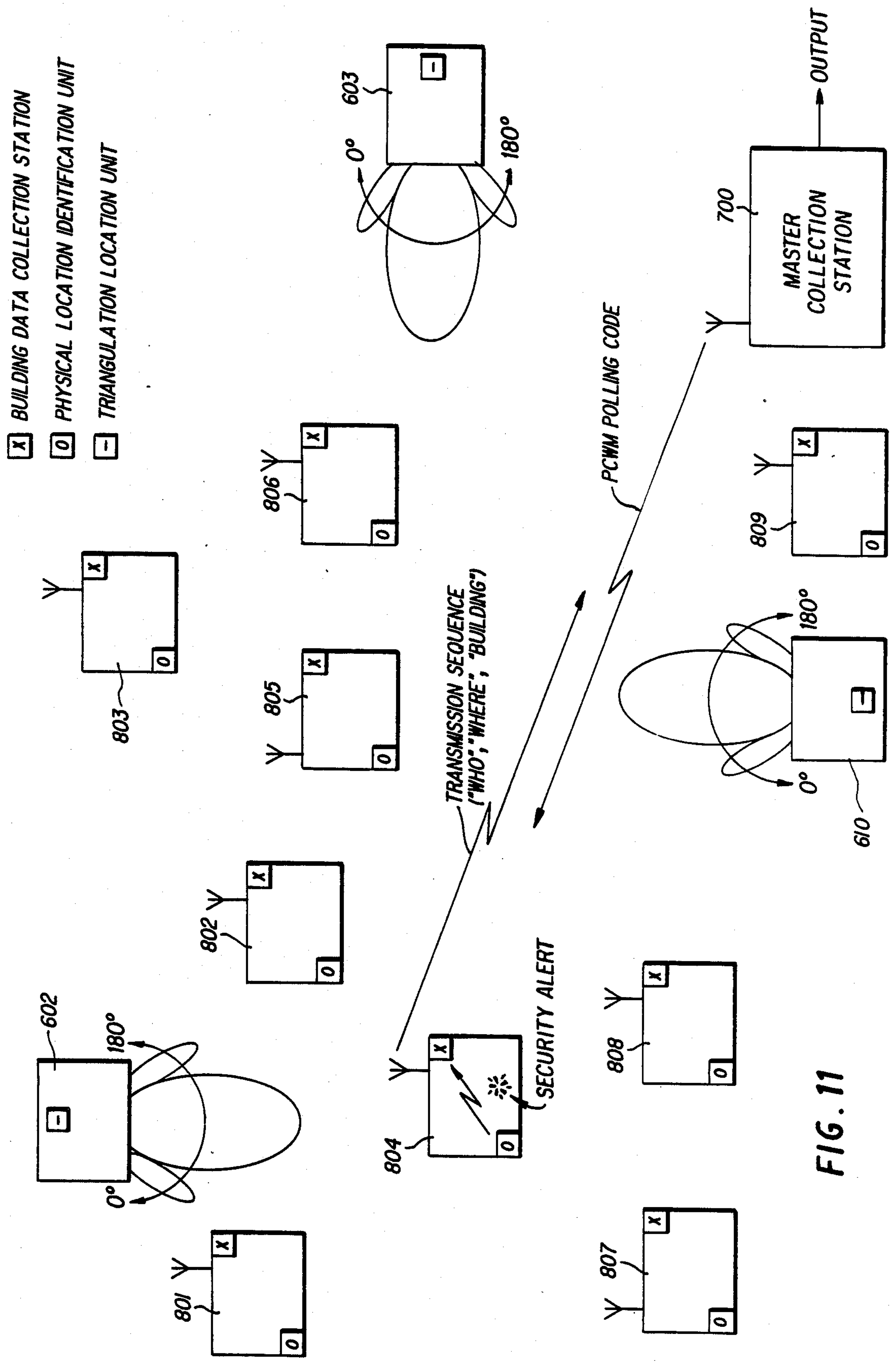
FIG. 11 is a block diagram illustrating the use of triangulation to determine the location of a particular alarm transmission.

FIG. 11 represents an attempt to show an example of the entire operation flow process of this invention in a simplistic manner. As illustrated, a security alert is made in proximity of the Physical Location Identification Unit 0 in Building 804. This unit transmits the assigned PCWM code of the individual "who" sounded the alert, and also transmits the code assigned to the Physical Location Identification Unit 0 for Building 804. Units 602, 603, and 610 do not see the signal since it originated in the building. Therefore, they will not report any information when polled by Master Collection Station 700. Building Data Collection Station X for Building 804, and shown as 570 in FIG. 7, receives and retains in its register the two PCWM coded transmissions until polled by Master Collection Station 700. Unit 700, which polls all of its data collection points (lets say) once every 2 seconds, accomplishes its polling sequence as follows:

| Action | Response |
|---|---|
| 1. Poll Building 801 | None |
| 2. Poll Building 802 | None |
| 3. Poll Building 803 | None |
| 4. Poll Building 804 | Security Alert: |
| | a. "who": |
| | b. "where": |
| | c. "building": |
| 5. Poll Building 805 | None |
| 6. Poll Building 806 | " |
| 7. Poll Building 807 | " |
| 8. Poll Building 809 | " |
| 9. Poll Building 810 | " |
| 10. Poll Triangulation Unit 602 | " |
| 11. Poll Triangulation Unit 603 | " |
| 12. Poll Triangulation Unit 610 | " |

The security alert activated in Building 804 will be written on CRT 730 (as shown in FIG. 9) in the example format shown in FIG. 10. At the end of the one to two second polling sequence (which could easily be done in a fraction of one (1) second, Master Central Data Collection Station 700 starts its polling sequence again (repeatedly). In other words, all the systems/units perform their missions consistent with all objects set forth for this invention. It is extremely important to remember that this invention can be easily reduced to profitable practice, and that the concepts so set forth in this patent application are applicable on a mammoth scale, including smaller applications such as School Buildings, Neighborhood Watch Programs, Shopping Malls, and more larger scope applications such as high industrial complexes with coverage capabilities of cities, states, countries, and the world. Of equal importance, is the fact that the invention can be employed to track individuals who may have been taken against their will outside the secured perimeter/area. This is easily accomplished by having PCWM Encoder/Transmitter 501 to repeat its coded alert, lets say, every 5 seconds. Antenna Triangulation Stations, such as units 602, 603, and 610 in FIG. 11 strategically situated throughout a city, state, etc., can then determine the location through their tie in, as explained in FIG. 11, in relation to a Master Central Data Collection Station similar to Station 700. Another major application is in kidnap cases wherein the kidnapper calls the telephone number of the hostage. By connecting telephone trunk lines into a PCWM Encoder/Transmitter's Modulator, then the telephone number of the phone(s) from where the call is made (as serviced by the trunk lines) can be easily determined by connecting the Circuit Monitor to the phone being called. Once the line is opened for communications, the telephone number of the caller can be made, with minor changes, to appear instantaneously on the Monitor.

What is claimed is:

1. A communications system including a central receiver and a plurality of transmitters wherein each transmitter transmits to the central receiver, the system comprising:

means in each transmitter for generating a modulated code particular to that transmitter, the code generating means including:

code determining means having a plurality circuit elements, each circuit element having a plurality of different pulse-width modes, means for setting each element in one of the modes to provide each transmitter with a unique code, wherein the number of codes available to the transmitter is determined by the number of modes raised to the power of the number of circuit elements;

means in each transmitter for generating a carrier signal for transmitting the modulated code of that transmitter to the receiver as a coded train;

means in the central receiver responsive to the carrier signal; and means in the central receiver for reading the code of a transmitter carried by the carrier signal upon receipt thereof by the receiver to identify the particular transmitter transmitting the code.

2. The communications system of claim 1 further including means in the receiver for reading various widths of pulses and display means in the reading means for displaying the receipt of pulses of various widths.

3. The communications system of claim 1 wherein the number of switches ranges between two and ten and the number of switch positions ranges between two and three.

4. The communication system of claim 3 wherein there are nine switches each of which has two positions resulting in $2^9$ or 512 different pulse trains.

5. The communications system of claim 3 wherein there are nine switches each of which has three switch positions resulting in $3^9$ or 19,683 different coded pulse trains.

6. The communications system of claim 1 wherein the communications system is a security system; wherein each transmitter is identified with a particular station; wherein each circuit element is a switch having means determining the plurality of different pulse width modes, and wherein the system further includes means associated with the receiver for displaying indicia indicative of the particular code received by this receiver.

7. The communications system of claim 6 wherein the means in the receiver responsive to the carrier signal incudes:

means for receiving the carrier signal and transmitting the signal simultaneously to a gated oscillator, a NAND gate and a first decade counter;

a plurality of AND gates connected to the decade counter; wherein the number of AND gates is equal to the number of switches, and wherein the decade counter activates the AND gates sequentially for each count of the coded pulse train;

a second decade counter having inputs from the gated oscillator and NAND gate and having an output to the plurality of AND gates; wherein the frequency of the gated oscillator controls the second decade counter to count only pulses of a width exceeding a minimum width, and wherein the NAND gate resets the decade counter after each pulse whereby the AND gates have an output for only pulses of a width exceeding the selected minimum width, and means for connecting the display means to the AND gates whereby the display means displays receipt only of pulses greater than the minimum width.

8. The communications system of claim 7 wherein the display means are a plurality of light emitting diodes, with one light emitting diode connected to each AND gate.

9. The communications system of claim 7 wherein the pulse train duration is approximately thirty-five milliseconds.

10. The communications system of claim 1 further including display means associated with with the receiver means for displaying indicia indicative of the particular code received by the receiver.

11. The communications system of claim 1 wherein the communications systems is a security alarm system and wherein each transmitter is identified with a particular station.

12. The communications system of claim 7 wherein the system is a security alarm system.

13. The communications system of claim 1 wherein each circuit element is a switch having the plurality of different pulse-width modes.

14. The communications system of claim 6 further including transmission means within said receiver, said transmission means responsive to reception of a code by the receiver and remote receiving means responsive to the transmission by the transmission means in the central receiver for performing a security function upon receipt of the signal from the transmission receiver.

15. The apparatus of claim 14 further including microprocessing means connected between the central receiver and display means for controlling the display means and for controlling the transmission means within the central receiver, wherein the microprocessing means includes instructions for the transmission means in the receiver in order to determine the response of the remote receiving means.

16. The communications system of claim 6 wherein the carrier wave is a radio wave and wherein the receiver system includes three directional antennas arranged in a triangular configuration whereby the point from which the carrier wave emanates is determined by triangulation.

17. A communications system including a central receiver system and a plurality of transmitters wherein each transmitter is identified with a particular station and each transmitter transmits to the central receiver, the system comprising:

means in each transmitter for generating a pulse-width modulated code particular to that transmitter, the code generating means including:

switching means having a plurality of switches each of which has a plurality of different pulse-width modes, means for setting each switch in one of the pulse-width modes to provide each transmitter with a base number, and means for pulsing the transmitter a predetermined number of times, wherein the number of codes available to all transmitters is determined by the base number raised to a power equal to the number of times the transmitter is pulsed;

means in each transmitter for generating a carrier signal for transmitting the pulse-width modulated code of that transmitter to the central receiver system as a coded pulse train;

means in the central receiver system for reading the code of a transmitter upon receipt thereof by the receiver to identify the particular transmitter transmitting the code.

18. The communications system of claim 17 wherein there are ten switches having two modes.

19. The communications system of claim 18 wherein there are ten switches having three modes.

20. The communications system of claim 17 wherein the receiver system includes a plurality of decoder chips equal in number to the number of switches each of which is connected through an AND gate to the display means, and wherein the receiver system further includes a strobe decade counter which strobes the AND gates to release the signal.

21. The communications system of claim 20 wherein the communications system is a security system and wherein the carrier wave is a radio wave and the receiver system includes three directional antennas arranged in a triangular configuration wherein the point from which the signal emanates is determined by triangulation.

22. The communications system of claim 20 wherein the pulse modulated codes are configured to generate different types of information each time the transmitter doing the transmission is pulsed.

23. The communications system of claim 22 wherein the pulse trains indicate "who", "where", and "what building" is transmitting the code.

24. The communications system of claim 17 wherein the communications system is a security alarm system.

* * * * *